Sept. 14, 1954  
E. KOLISCH  
2,689,082  
EQUIPMENT FOR CALCULATING AND FOR RATING  
BY VOLUME, WEIGHT, DENSITY, AND ZONE  
Filed Nov. 17, 1951  
4 Sheets-Sheet 1
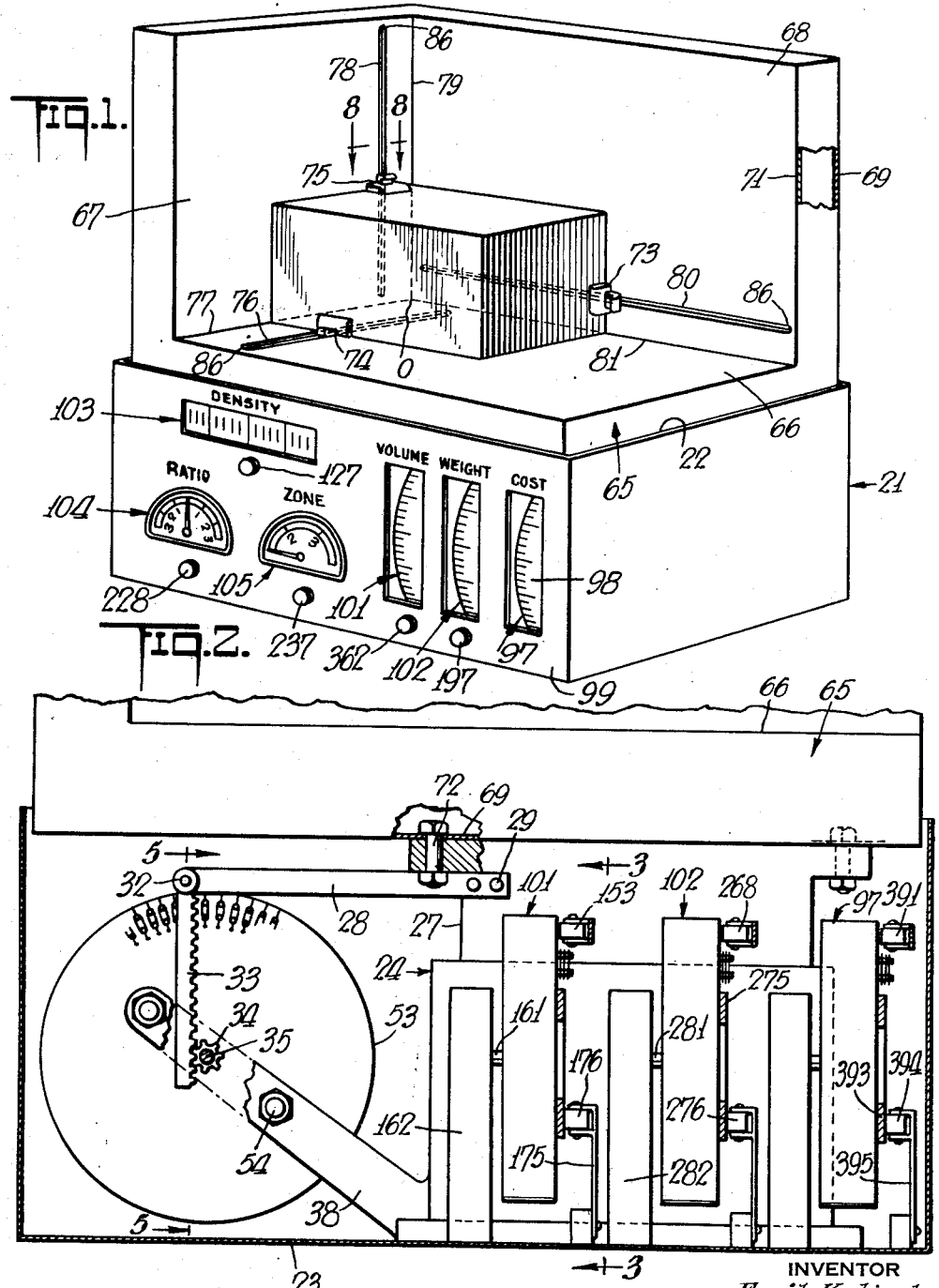
INVENTOR  
*Emil Kolisch*  
BY  
*Dean Fairbank Hirsch*  
ATTORNEYS

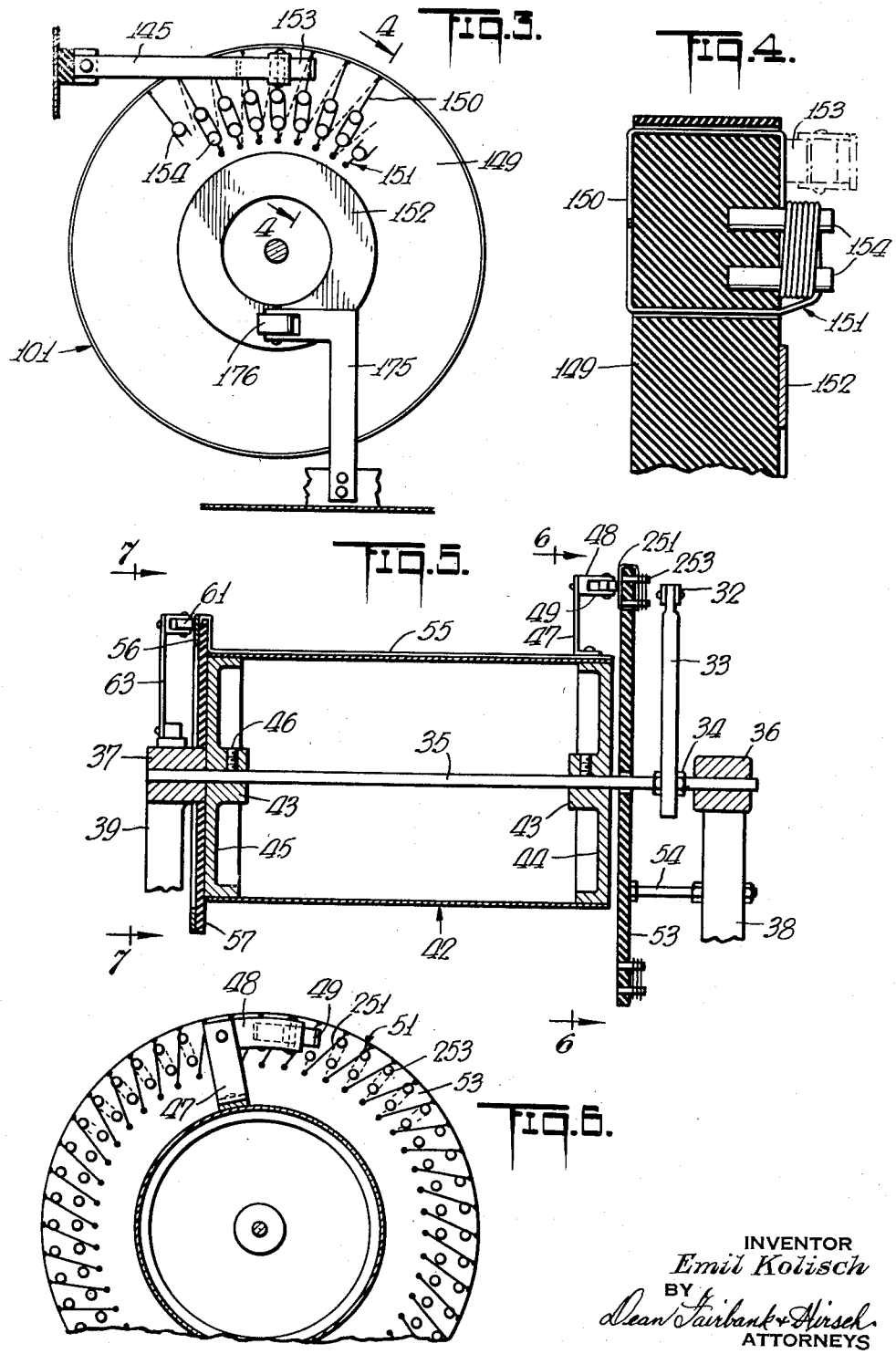

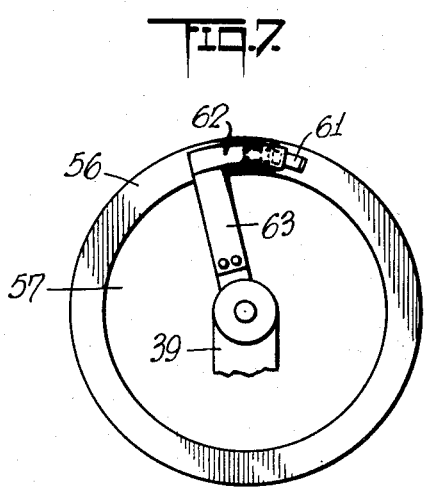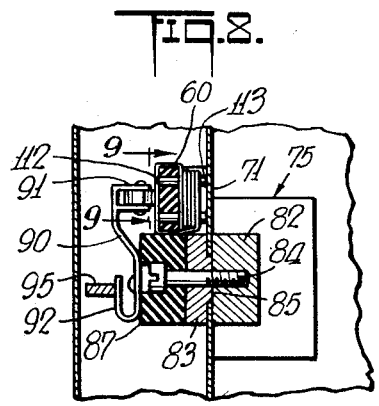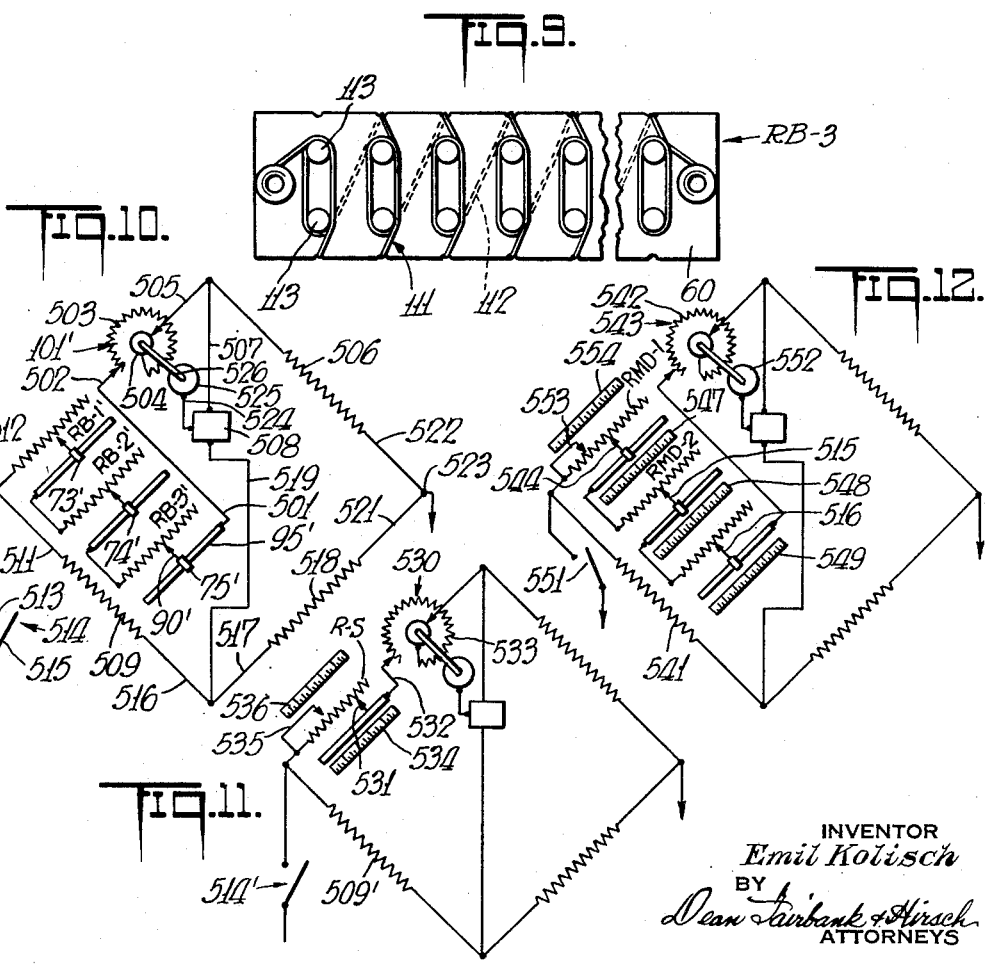

Sept. 14, 1954                    E. KOLISCH                     2,689,082
              EQUIPMENT FOR CALCULATING AND FOR RATING
                BY VOLUME, WEIGHT, DENSITY, AND ZONE
Filed Nov. 17, 1951                                         4 Sheets-Sheet 4
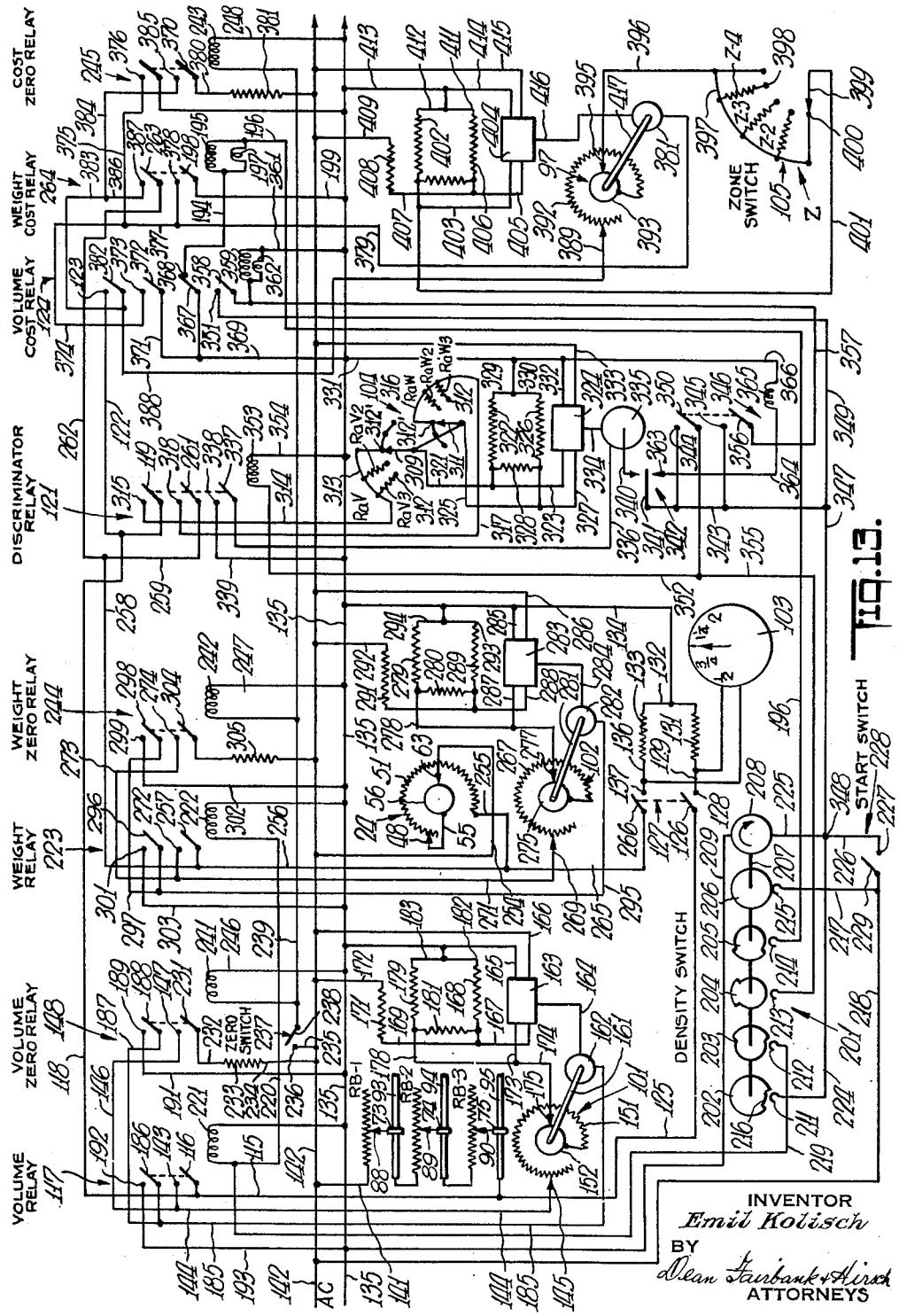
INVENTOR
*Emil Kolisch*
BY
*Dean Fairbank & Hirsch*
ATTORNEYS Patented Sept. 14, 1954

2,689,082

UNITED STATES PATENT OFFICE 2,689,082

EQUIPMENT FOR CALCULATING AND FOR RATING BY VOLUME, WEIGHT, DENSITY, AND ZONE

Emil Kolisch, New York, N. Y., assignor to Continental Silver Co. Inc., Brooklyn, N. Y., a corporation of New York Application November 17, 1951, Serial No. 256,923

5 Claims. (Cl. 235—61)

1

In the rating of objects and packages, as for instance, for determining transportation charges by air express, post office, express, truck or other delivery service organizations, either the weight or the volume of the object or package may be the determining factor for the shipping charge. Ordinarily the weight of the object forms the basis for such charge, but where the object has a relatively large volume and a small weight, as for instance, boxed flowers, some transportation services base their charge on volume.

In the shipment of objects by aircraft where the volume of the aircraft is fixed as is the weight carrying capacity which depends on the distance to be travelled, it is desirable that the volume and weight of each object to be shipped bear a definite relation to each other for optimum loading of the aircraft.

Where, in order to determine the shipping charge, or the relation between volume and weight, an object must be measured by rule or tape and the length, width and height multiplied to determine volume, whether with or without resort to multiplication tables, and the weight of the object must be separately determined by placing it on a weighing scale and the two values compared in order to determine which is the proper basis of charge or to determine the relation between volume and weight, such operaations are time-consuming, costly and subject to error.

In present practice the post office limits the overall dimensions of an object, i. e. its combined length and girth to a given maximum amount. Where to determine this amount, it is necessary for the post office employee to measure by rule or tape the length of the object and then measure the width and height and multiply such dimensions by two to determine girth and the length and girth are added to determine the overall dimensions, such operations are also time-consuming, costly and subject to error.

Where, to measure the length, width and height of an object, a plurality of parallel connected resistances of values correlated with the parameters being measured and designed to pass a combined current proportional to the logarithm of the volume of such object, are connected to feed such combined current into an electric indicating device such as a meter having a logarithmic scale which is calibrated to give a direct reading of volume or of cost based upon volume, it is extremely difficult to read the values of volume or cost at the crowded end of the logarithmic scale and in addition fluctua-

2 tions in the applied voltage will change the currents through the resistances so that the resultant readings will not be accurate.

Where, for a given volume, a given weight is to have the same monetary rating and that relationship between volume and weight is proportionately maintained throughout the range of the equipment and a weighing scale is designed to place in circuit current limiting means or resistance correlated with the weight of the object, and the current through such resistance is fed into an electric indicating device such as a meter having a logarithmic scale which may be calibrated to read the cost or the weight of the object directly, such meter will be difficult to read and the indication will be inaccurate as previously pointed out.

It is accordingly among the objects of the invention to provide a simple, expeditious and reliable method and equipment to execute the same, with relatively few moving parts not likely to become deranged and which may readily be operated, automatically, speedily and accurately to measure the volume of an object and as accurately to indicate such volume by means of an indicating device having a linear scale, with resultant facility in reading.

Another object is to provide a method and equipment of the above type, which may readily be operated automatically, speedily and accurately to measure the volume and the weight of an object and as accurately to indicate such parameters by means of an indicating device having a linear scale, with resultant facility in reading, said equipment automatically rating such objects according to volume or weight and (based on a predetermined relation of the volume and weight, which relation may be varied at will), automatically determining which of such ratings, whether for volume or for weight, will be the basis for shipment charge of such object and automatically and accurately indicating such charge also on a linear scale, without the need for manually measuring the object, consulting tables or doing calculations of any sort.

Another object is to provide a method and equipment of the above type which may readily be operated automatically, speedily and accurately to measure the volume and weight of an object and to compare such parameters to determine the relation of volume to weight or the density of the object.

Still another object is to provide a method and equipment which may readily be operated automatically, speedily and accurately to measure the length and girth of an object and to add such dimensions and automatically and accurately to indicate the sum of such dimensions without the need for manually measuring the object, consulting tables or doing calculations of any sort.

According to one aspect of the invention, each of the three dimensions of length, width and height of the object is determined by the coaction with such object of suitable measuring means, which, through electrical circuits, automatically determines such parameters and the volume classification of such object. Simultaneously the weight classification of the object is determined by means of a suitable weighing scale on which the object may rest while determining the volume classification. The classifications simultaneously effected of volume and weight are automatically correlated, according to the invention, in such manner that within a given range of relationship between volume and weight, the weight controls the charge rating, desirably registered by a suitable indicating device, while outside of that range the basis of the charge rating is automatically shifted for volume to be the controlling parameter. In addition, such classifications of volume and weight may be automatically correlated to determine the ratio of the weight to the volume or the density of the object. According to another aspect of the invention, the length and girth of the object is determined by the coaction with such object of suitable measuring means which, through electrical circuits, automatically determines such parameters and adds the same to determine the overall dimensions of the object.

According to an illustrative embodiment of the invention, the volume measuring portion of the equipment desirably comprises a frame having a horizontal platform, an end wall and a rear wall, each having a slidable measuring member which may be moved to engage the extremities of the object to determine its maximum dimensions such as its width, height and length respectively. The weight measuring portion of the equipment desirably comprises a weighing scale associated with and carrying the frame so that an object placed on said platform simultaneously will have its dimensions and weight determined.

Each of the slidable members of the volume measuring portion of the equipment controls a switch which automatically places in circuit a current limiting means or resistance bank having a value correlated respectively with the three parameters being measured. By connecting the three resistance banks in series, the combined value thereof will be equal to the sum of the individual resistance banks. Each of the resistance banks is of a value that is a function of the logarithm of the associated dimension of the object being measured. Consequently, the sum of the logarithmic resistances will also be a function of the volume of such object and a suitable indicating device controlled by such combined resistance is calibrated to indicate the volume of the object.

Simultaneously with the determination of volume, the weighing scale is designed to place in circuit current limiting means or resistance correlated with the weight of the object. In one application in which the amount to be charged for the object being shipped is effected only by weight or only by volume, but in which the relation of weight to volume automatically determines the cost controlling factor, the current limiting means or resistances controlled by volume and those controlled by weight are so correlated that for corresponding numerical values in the volume sequence and the weight sequence, the resistances are equal. That is, for a given volume, a given weight is to have the same monetary rating and that relationship between volume and weight is proportionally maintained throughout the range of the equipment. To this end, a bank of resistances is controlled by the weighing scale and the magnitude of each resistance element in that bank is equal to the magnitude of the combined value of resistance of the series connected resistance banks which determine the corresponding volume rating and the weight controlled resistances controls a suitable indicating device calibrated to indicate the weight of the object.

More specifically, the series connected volume resistance banks and the weight resistance bank each has an indicating device having a resistance in series therewith, the volume resistance bank and its associated indicating resistance forming one arm of a Wheatstone bridge and the weight resistance bank and its associated indicating resistance forming one arm of another Wheatstone bridge. In addition, a balancing resistance is provided in each bridge to form another arm thereof. Each indicating device illustratively comprises a drum having a linear scale thereon calibrated in units of volume and weight respectively. Each drum resistance is of such value that for any given combined value of resistance in the series connected resistances and for any given value in the weight resistance, associated respectively with a given volume and a given weight, there is a value of resistance on each of the drums which, when added to the associated series connected resistance or the weight resistance will equal the value of the balancing resistance.

Each of the drums is driven by a suitable motor controlled by the output of the associated Wheatstone bridge. Thus, if the resistances on the indicating drums of the bridges should be equal to the difference between the value of the associated balancing resistance and the value of the resistance in the volume portion or weight portion of the respective bridges, the bridges will be in balance and no current will be fed to the associated motor to rotate the drum. Consequently, the latter will indicate a value correlated with the value of the drum resistance in circuit which will be equal to the volume or to the weight respectively, of the object.

If, however, the resistance on the indicating drum be greater or less than the difference between the associated balancing resistance, and the resistance in the volume or weight portions of the respective bridge, the bridge would be out of balance and current would flow to the associated motor thereby to rotate the drum. Such rotation would continue until the resistance on the indicating drum of the bridge is equal to the desired difference, at which time the bridge will again be in balance and the motor will be deenergized. At such time the drum will indicate a value equal to the volume and weight of the object respectively.

Of the two currents (weight controlled and volume controlled), that which preponderates controls the cost indication which is desirably effected, in the embodiment herein shown, by a drum similar to the drums indicating volume and weight and also calibrated with a linear scale preferably in monetary units and in the preferred embodiment, when the currents are equal it is the weight current that controls the cost drum.

To effect such control, it is preferred to connect the series connected volume resistances and the weight resistance in a suitable discriminator circuit, also preferably a Wheatstone bridge, in which the volume resistances form one arm thereof and the weight resistance forms another arm thereof. A motor, similar to the motor driving the volume and weight drums, is fed by the output of such bridge and is actuated by predominance, say of volume controlled current, to shift the connection for feeding volume controlled current to the cost indicating device and the disscriminator circuit is designed to feed weight controlled current to such cost indicating device at all other times. Desirably the cost indicating drum also has a resistance thereon of such value that for a given volume or a given weight, a resistance of predetermined value may be placed in circuit, and the resistances on the cost drum together with either the series connected volume resistances, or the weight resistance form one of the arms of another bridge circuit in which a balancing resistance forms another arm.

The cost drum is driven by a suitable motor also similar to the motors driving the volume and weight drums and such motor is fed by the output of the cost bridge. Thus, if the value of the resistance controlled by the cost drum should be equal to the difference between the value of the balancing resistance in one arm of the cost bridge and the volume of either the volume or weight resistance in another arm, such bridge will be in balance and no current will be fed to the motor to rotate the cost drum. Consequently the latter will indicate a charge correlated with the value of the drum resistance in circuit based upon the volume or weight of the object as the case may be. If, however, the resistance in the cost indicating arm of the bridge should be greater or less than such difference, the bridge would be out of balance and current would flow to the motor thereby to rotate the cost drum. Such rotation would continue until the resistance on the indicating drum placed in circuit is equal to the difference between the balancing resistance and either the volume or weight resistances as the case may be, and at such time the bridge will be in balance and the motor will be deenergized, the drum having rotated to indicate the cost based on the volume or weight of the object.

Desirably the device is also equipped with suitable circuits to indicate the relation between the volume and the weight, that is, the density of the object being shipped. To this end, a bridge circuit is provided into which the volume and weight resistances may be switched to form two arms of such bridge. By means of a suitable indicating device connected across the bridge, preferably an electric meter having a center type scale, if the volume current predominates, the needle of the meter will move in one direction and if the weight current predominates, the needle of the meter will move in the opposite direction and such meter, in the illustrative embodiment herein, is calibrated to read "one" when the volume and weight are equal and greater or less than "one" when such currents differ.

In another embodiment of the invention, the equipment desirably comprises a frame having a horizontal platform, an end wall and a rear wall, each having a slidable measuring member which may be moved to engage the extremities of the object to determine its maximum dimensions such as its width, height and length respectively.

Each of the slidable members controls a switch which automatically places in circuit a current limiting means or resistance bank correlated respectively with the three parameters being measured. The slidable member measuring length is designed to place in circuit a resistance directly related to the length and the slidable members measuring width and height are designed to place in circuit resistance directly related to twice the width and twice the height. By connecting the three resistance banks in series, the combined value thereof will be equal to the length plus the girth of the object and a suitable indicating device controlled by such combined resistance is calibrated to indicate the overall dimensions of the object.

More specifically the indicating device has a resistance connected in series with the series connected resistance banks and the combined resistances form one arm of a Wheatstone bridge, a balancing resistance forming another arm of said bridge. The indicating device illustratively comprises a drum having a linear scale thereon and the drum resistance is of such value that for any given combined value of resistance in the series connected resistances associated with a given overall dimension, there is a value of resistance on the drum which is the difference between the value of the balancing resistance and the value of the series connected resistances.

The drum is driven by a suitable motor controlled by the output of the bridge. If the resistance on the indicating drum should be equal to the difference between the balancing resistance and the series connected resistances, the bridge will be in balance and no current will be fed to the associated motor to rotate the drum. Consequently the latter will indicate a value correlated with the value of the drum resistance in circuit which will be equal to the overall dimensions of the object.

If, however, the resistance on the indicating drum should be greater or less than the difference between the balancing resistance and the series connected resistances, the bridge would be out of balance and current would flow to the motor thereby to rotate the drum. Such rotation would continue until the resistance of the indicating device is equal to the desired difference at which time the bridge would be in balance and the motor would be deenergized. At such time the drum would indicate a value equal to the overall dimensions of the object.

This application is a continuation-in-part of co-pending applications Serial No. 201,905, filed December 21, 1950; Serial No. 217,934, filed March 28, 1951; and Serial No. 242,531, filed August 18, 1951.

In the accompanying drawings in which are shown one or more of various possible embodiments of the several features of the invention, Fig. 1 is a perspective view of an illustrative equipment for rating objects, Fig. 2 is a front elevational view of the equipment shown in Fig. 1 on a larger scale, with parts broken away, Fig. 3 is a sectional view taken along line 3—3 of Fig. 2 showing one of the indicating drums.

Fig. 4 is a fragmentary sectional view on a greatly enlarged scale taken along line 4—4 of Fig. 3, Fig. 5 is a fragmentary sectional view taken along line 5—5 of Fig. 2, Fig. 6 is a fragmentary transverse sectional view on a larger scale taken along line 6—6 of Fig. 5, Fig. 7 is a transverse sectional view taken along line 7—7 of Fig. 5, Fig. 8 is a detailed sectional view on a greatly enlarged scale taken along line 8—8 of Fig. 1, Fig. 9 is a fragmentary detail view taken along line 9—9 of Fig. 8, Fig. 10 is a circuit diagram illustrating the application of the principle of the invention to measure the length and girth of an object, Fig. 11 illustrates a simplified circuit to subtract, Fig. 12 illustrates a simplified circuit to multiply and divide, and Fig. 13 is an elaborate circuit diagram illustrating the application of the principle of the invention shown in Figs. 1 to 9 in a substantially commercial embodiment thereof.

Before proceeding to a description of the circuit, an equipment with which the invention may be practiced will be briefly described.

The rating equipment will be described as suitable for rating by volume objects up to a length of 5 units, height of 4 units and width of 4 units in increments of one unit, from one unit up, and for rating by weight objects up to 10 units also in increments from one unit up. It is of course to be understood that the equipment could rate objects of a much greater range of size or weight and the simple example herein shown and described illustrates the principles of the invention. The units of lengths, width and height may be centimeters, meters, inches, feet, yards or any arbitrary unit of length as desired, and the units of weight may be grams, ounces or pounds, or any arbitrary unit of weight as desired.

In Fig. 1 is shown a rectangular housing 21 illustratively a box of any suitable material having an open top 22. Mounted on the floor 23 of the housing 21 as shown in Fig. 2 is a weighing scale 24 which may be of any suitable type, such as, for example, that put out by Pitney-Bowes Company and designated by the trademark "Postometer" and such weighing scale will only be described to the extent necessary for a clear understanding of the invention. As shown in Fig. 2, the weighing scale comprises a vertically movable support 27 controlled by a weight placed thereon to move the actuating arm 28 affixed thereto as at 29. The free end 32 of the actuating arm 28 carries a rack 33 which engages a pinion 34 affixed on a transverse shaft 35 rotatively mounted in suitable bearings 36 and 37, as shown in Fig. 5, at the free ends of fixed arms 38 and 39 respectively, extending obliquely upwardly from the bottom of the weighing scale 24. Mounted on shaft 35 is a drum 42 which desirably has axial hubs 43 on each of the end walls 44 and 45 thereof, said hubs being rigidly affixed to said transverse shaft by means of set screws 46.

Affixed on the periphery of the drum 42 adjacent end wall 44 thereof, and extending radially outward therefrom, is a bracket 47, shown in Figs. 5 and 6, the free end of which carries a laterally extending wiper arm 48 mounting a contact shoe 49 at the free end thereof. Associated with wiper arm 48 and engaged by shoe 49 thereof is a resistance 51 preferably a continuous length of resistance wire which, as shown in Figs. 5 and 6 is desirably mounted on a circular plate 53 of insulating material affixed by spacer bolts 54 to arm 38, said plate 53 lying in a plane parallel to end wall 44 of drum 42 and being interposed between said end wall 44 and rack 33.

The wiper arm 48 is electrically connected through bracket 47 and conducting strip 55 on drum 42, extending longitudinally thereof, to annular slip ring 56 mounted on a plate 57 of insulating material affixed to end wall 45 of the drum. As shown in Figs. 5 and 7, slip ring 56 is engaged by contact shoe 61 mounted at the end of wiper arm 62 affixed to and extending laterally outward from bracket 63 mounted on arm 39 and insulated therefrom.

Mounted on the vertical support 27 of the weighing scale is a frame 65 by means of which the dimensions of the object being rated can be measured. As shown in Figs. 1 and 2, the frame 65 desirably comprises a substantially rectangular platform 66, of dimensions slightly less than that of the open top 22 of the rectangular housing 21, an end wall 67 and a rear wall 68. The platform and said walls each desirably comprises a pair of spaced parallel plates 69 and 71 as shown in Fig. 1, the plate 69 of platform 66 which forms the floor of frame 65 being affixed to support 27 as by bolts 72 (Fig. 2).

In order to determine the length, width and height respectively of the object to be rated, the frame 65 desirably has a plurality of measuring members 73, 74 and 75 slidably mounted thereon adjacent the three axes of a three dimensional system of rectangular coordinates. To this end the plate 71 of platform 66 desirably has a transverse slot 76 therein adjacent the end edge 77 thereof, the plate 71 of wall 67 desirably has a vertical slot 78 therein adjacent the vertical edge 79 of the frame and the plate 71 of wall 68 desirably has a longitudinal slot 80 therein adjacent the lower edge 81 thereof.

The measuring members (Fig. 8) each desirably comprises a pair of blocks 82, 83 positioned respectively on each side of the associated slot and retained together by screw 84. One of the blocks, i. e., block 82, is positioned on the outer surface of the associated plate 71 and defines a finger to engage the object being measured and the other of said blocks, i. e., the block 83, which is on the inner side of the associated plate 71, has a projecting portion or rib 85, which extends into the slot to guide the measuring member therealong.

Although the measuring members as illustratively shown are manually movable along the associated slots, it is of course to be understood that they could normally be spring retained at the ends 86 of such slots and moved into engagement with the extremities of the object being measured by any suitable mechanical or electrical means which would be obvious to one skilled in the art.

Desirably, the screw 84 of each of the measuring members, as shown in Fig. 8, also mounts an insulating strip 87 to the guide member 83. The insulating strips 87 associated with the measuring members 73, 74 and 75, carry wiper arms 88, 89 and 90 respectively, each of which mounts a roller 91, which, as shown in Figs. 8 and 9, may be moved respectively along the length of an associated insulating strip 60 affixed to plate 71 and extending parallel respectively to each of the slots 80, 76 and 78, to engage the resistance 111 thereon which forms resistance banks RB-1, RB-2 and RB-3 to measure length, width and height respectively.

Desirably the affixed end of each of the wiper arms 88, 89 and 90 is reversely bent as at 92 and each engages a contact rail 93, 94 and 95 (Figs. 8 and 13), said rails being supported at their ends on the associated plate 71 and insulated therefrom.

With the construction above described, after the measuring members 73, 74 and 75 are moved to the ends 86 of the associated slots, if for example, an object or package is placed on platform 66 as shown in Fig. 1 with its corner at the origin "O" and engaging the end wall 67 and the rear wall 68 and the measuring members are moved along their associated slots so that the associated fingers 82 engage the end, side and top of the box, the wiper arms 88, 89 and 90 controlled by each of the measuring members will place in circuit that portion of the associated resistance bank RB-1, RB-2 and RB-3, correlated with a longitudinal, transverse and vertical dimension of the object. In addition, the weight of the object on the platform 66 will affect the weighing scale, which is previously set at zero to compensate for the weight of the frame 65, so that the contact shoe 49 on the wiper arm 48 mounted on drum 42 will place in circuit that portion of resistance 51 correlated with the weight of the object.

The electrical circuits hereinafter described are controlled by the dimensions and by the weight of the object in order to determine the shipping charge or rating (whether according to volume or to weight) upon an indicating device, illustratively a drum 97 having its periphery 98 exposed through the front wall 99 of the housing 21, and which desirably has such periphery calibrated in monetary units such as in cents, automatically to register the charge or rating of the particular object.

If desired, the housing may also have similar indicating drums 101 and 102 calibrated, for example, in cubic inches and pounds to indicate the volume and weight respectively of the object and an electric meter 103, desirably of the center scale type, having a pointer normally at center position to indicate the ratio of the weight to the volume or the density of the object, said drums and meter also being exposed through the front panel 99 of the casing. The equipment may also have one or more additional control switches to introduce further factors that may be significant in determining the rating of the object. Thus, there is shown on housing 21 a manually operable control switch 104 designated the ratio switch, which serves to set up a predetermined relation between weight and volume in determining the rating. Moreover, there is shown a switch 105 designated the zone switch which serves to multiply the basic charge or rating by a predetermined factor illustratively in accordance with the postal or other zone to which the object is to be transported.

Thus, the drum 97 will indicate the amount to be charged for transportation of an object placed on the equipment, such charge to depend usually on weight. But in all such cases where the volume is to be the controlling factor, such volume rather than the weight, shall control the drum reading, which reading automatically takes into account also the ratio factor determined by switch 104, and the zone factor determined by switch 105, all of which will appear more clearly from the following description of the electrical circuits.

Referring now to the circuit diagram shown in Fig. 13, the three resistance banks designated RB-1, RB-2 and RB-3 are so designed as to place in circuit a resistance of ohmic value which is a function of the logarithm of the dimension being measured, said resistance banks being connected in series to provide a combined resistance of ohmic value which is a function of the product of the dimensions or the volume of the object being measured.

To form each of the resistance banks RB-1, RB-2 and RB-3, as shown in Figs. 8 and 9, the resistance 111 which desirably is a continuous length of wire, is wound on each of the insulating strips 60 in such manner as to provide a plurality of equally spaced runs 112 on the surface of the strip 60 adjacent the associated wiper roller 91 so that such runs 112 may successively be engaged by such roller as the associated measuring member is moved. Although each run may be spaced by any desired distance depending upon the increments to be measured, in the illustrative embodiment herein shown, they are one inch apart.

The resistance wire 111 is so wound on the associated strip 60 that when any run 112 which is associated with a dimension being classified, is engaged by the associated roller 91, a resistance of predetermined value which is a function of the logarithm of such dimension will be placed in circuit. To this end, the strip 60 may have spaced pairs of pegs 113 extending laterally outward from the surface thereof opposed to the runs 112 and the wire 112 may be wound around such pegs so that the resistance placed in circuit when each run is engaged may be predetermined.

To connect the resistance banks RB-1, RB-2 and RB-3 in series, as shown in Fig. 13, one end of resistance wire 111 of resistance bank RB-1, is connected by lead 141 to A. C. main 142. The contact rail 93 which carries wiper arm 88 engaging wire 111 of resistance bank RB-1 is connected to one end of wire 111 of resistance bank RB-2. The contact rail 94 which carries wiper arm 89 engaging wire 111 of resistance bank RB-2 is connected to one end of wire 111 of resistance bank RB-3. The contact rail 95 which carries wiper arm 90 engaging wire 111 of resistance bank RB-3 is connected by lead 115 to movable contact arm 116 of volume relay 117, by leads 115 and 118 to movable arm 119 of discriminator relay 121 and by leads 115, 118 and 122 to fixed contact 123 of volume cost relay 124. Contact rail 95 is also connected by lead 125 to movable arm 126 of double pole single throw switch 127, which may be mounted on front panel 99 of the casing. Fixed contact 128 of switch 127 is connected by lead 129 to one end of resistance 131, the other end of which is connected by lead 132 to one end of resistance 133 which is substantially identical to resistance 131 and also by lead 134 to A. C. main 135. The other end of resistance 133 is connected by lead 136 to fixed contact 137 of switch 127, the meter 103 being connected across contacts 128 and 137 to indicate density in the manner hereinafter to be described.

Fixed contact 143 of volume relay 117 is connected by lead 144 to wiper arm 145 of volume indicating drum 101 as shown in Figs. 3 and 13 and contact 143 is also connected by lead 146 to fixed contact 147 of volume zero relay 148. As shown in Figs. 2, 3 and 4, the volume indicating drum 101 desirably comprises a disc 149 of insulating material having a continuous length of resistance wire 151 wound thereon, one end of which is connected to a contact ring 152 affixed on said disc. The resistance wire 151 is so wound on drum 101 that equally spaced runs 150 thereof will extend substantially radially thereon so that they may be engaged by a contact shoe 153 carried by wiper arm 145, said shoe desirably being of width greater than the distance between adjacent runs 150 so that at all times at least one run will be engaged to provide a continuous circuit.

Each run 150 of wire 151 on drum 101 is related to a given value of volume and the resistance placed in circuit when any run is engaged. is of predetermined value related to such volume. In order to facilitate construction of the device so that the resistance of each run may be predetermined, the drum has a plurality of pairs of pegs 154 mounted thereon as is clearly shown in Fig. 4 around which the resistance wire 151 may be wound, thereby to facilitate making each run of desired resistance.

Drum 101, as shown in Figs. 2 and 13 is operatively connected by shaft 161 to a servo-motor 162 which is controlled by means of a servo-amplifier 163 such as of the type put out by the Brown Instrument Division of the Minneapolis Honeywell Regulator Company, the servo-motor and servo-amplifier being designated as the Brown Electronik "continuous balance" unit No. 354,574. The output of the servo-amplifier 163 is connected to servo-motor 162 by lead 164 and the power input to the servo-amplifier 163 is supplied by means of leads 165 and 166, which are connected respectively to A. C. mains 135 and 142. One of the input leads 167 to the servo-amplifier 163 is connected to one end of resistance 168 and is also connected by lead 169 to one end of balancing resistance 171, the other end of which is connected by lead 172 to A. C. main 142. The other input lead 173 of servo-amplifier 163 is connected by lead 174 to wiper arm 175 which mounts contact roller 176 at its free end, the latter engaging contact ring 152. Input lead 173 is also connected by lead 178 to one end of resistance 179, which is identical in value to resistance 168.

As shown in Fig. 13, an impedance matching resistance 181 is desirably connected across input leads 167 and 178 for optimum operation of servo-amplifier 163. The ends 182 of resistances 168, 179 are connected by common lead 183 to lead 165 and thence to A. C. main 135.

The servo-motor 162 is connected by lead 185 to movable arm 186 of volume relay 117 and by lead 187 to movable arm 188 of volume zero relay 143. The fixed contact 189 associated with movable arm 188 and the fixed contact 192 associated with movable arm 186 are connected by leads 191, 193 respectively to A. C. main 135, engagement of arm 186 and contact 192 providing energizing potential for servo-motor 162.

In order to control the operation of the equipment in a predetermined timed sequence, a timer 201 is provided which, as shown in Fig. 13, desirably comprises a plurality of discs of conducting material designated 202, 203, 204, 205 and 206 and all affixed on a shaft 207 also of conducting material which is driven by a motor 208 preferably of the alternating current type, one of the power inputs of which is connected by lead 209 to A. C. main 135.

Each disc has a wiper arm 211, 212, 213, 214 and 215 associated therewith respectively and adapted to engage the periphery of the associated disc. The discs 202, 203, 204 and 205 have notches 216 of different lengths in their periphery in which the wiper arms are normally positioned to break the circuit from the wiper arm to the associated disc, and disc 206 is continuously engaged by its associated wiper arm 215 which is connected by leads 217 and 218 to A. C. main 142. The wiper arm 212 is connected by leads 219 and 220 to one side of the coils 221 and 222 of volume relay 117 and weight relay 223. The wiper arm 211 is connected by leads 224 and 225 to the other power input of motor 208; by leads 224 and 226 to fixed contact 227 of start switch 228 desirably mounted on front panel 99 of the casing, the movable arm 229 of switch 228 being connected to lead 218 which in turn is connected to A. C. main 142.

The movable arm 231 of volume zero relay 148 is connected by lead 232 to one end of zeroing resistance 233, the other side of which is connected by lead 234 to A. C. main 142. Main 142 is connected by lead 235 to fixed contact 236 of zeroing switch 237, the movable arm 238 of which is connected by lead 239 to one side of the coils 241, 242 and 243 of volume zero relay 148, weight zero relay 244 and cost zero relay 245, the other side of said coils being connected by leads 246, 247 and 248 to A. C. main 135.

The resistance 51 on weight drum 42 is desirably so mounted thereon that as the drum is rotated by a weight placed on the scale, resistance of predetermined value may be placed in circuit. To this end the resistance 51 is a continuous length of wire wound on the periphery of disc 53 in such manner as to extend in equally spaced parallel runs 251 therearound, a plurality of pairs of pegs 253 desirably being provided on disc 53 around which wire 51 may be wound to form runs of predetermined resistance, related respectively to a predetermined weight so that when engaged by the contact shoe 49 such predetermined resistance will be placed in circuit. The shoe 49 desirably is of width greater than the distance between adjacent runs 251 so that at all times at least one run will be engaged to provide a continuous circuit.

The wiper arm 48 as heretofore described is connected by lead 55 to contact ring 56 engaged by roller 61 on wiper arm 63 and the latter is connected by lead 254 to A. C. main 142. The free end of resistance 51 is connected by leads 255 and 256 to movable arm 257 of weight relay 223 and the latter is connected by leads 258 and 259 to movable arm 261 of discriminator relay 124, said arm 261 being connected by leads 259 and 262 to movable arm 263 of weight cost relay 264. Resistance 51 is also connected by leads 255 and 265 to movable arm 266 of switch 127.

Associated with scale 24 is the weight indicating drum 102 which is substantially identical to volume indicating drum 101 and hence will not be described in detail. The resistance 267 mounted on drum 102 is engaged by the contact shoe 268 at the end of wiper arm 269 and said wiper arm is connected by lead 271 to fixed contact 272 of weight relay 223 and by lead 273 to fixed contact 274 of weight zero relay 244. The end of resistance 267 is connected to a contact ring 275 mounted on drum 102 and insulated therefrom and such contact ring 275 is engaged by the roller 276 mounted on wiper arm 277, the latter being connected by lead 278 to one end of resistance 279.

Drum 102, as shown in Figs. 2 and 10, is operatively connected by shaft 281 to a servo-motor 282 which is controlled by means of a servo-amplifier 283, the motor 282 and amplifier 283 being of the type previously described. The output of the servo-amplifier 283 is connected to servo-motor 282 by lead 284 and the power input to the servo-amplifier 283 is supplied by means of leads 285 and 286 which are connected respectively to A. C. mains 135 and 142. One of the input leads 287 of the servo-amplifier 283 is connected through lead 278 to resistance 279 and the other input lead 288 of the servo-amplifier is connected to one end of resistance 289, which is identical in value to resistance 279, lead 288 also being connected to one end of balancing resistance 291, the other end of which is connected by lead 292 to A. C. main 142. The ends 293 of resistances 279 and 289 are connected by common lead 294 which in turn is connected to A. C. main 135. An impedance matching resistance 280 is desirably connected across input leads 287 and 288 for optimum operation of servo-amplifier 283. The servo-motor 282 is connected by lead 295 to movable contact arm 296 of weight relay 223, and said arm 296 is connected by lead 297 to movable arm 298 of weight zero relay 244. Fixed contacts 299 and 301 associated with movable arms 298 and 296 respectively are connected by leads 302 and 303 to A. C. main 135, engagement of arm 296 and contact 301 providing energizing potential for servo-motor 282. The movable arm 304 of weight zero relay 244 is connected to one end of zeroing resistance 305, the other end of which is connected to A. C. main 142.

Associated with the discriminator relay 121 is the ratio switch 104 which controls resistance banks designated R$a$V and R$a$W which are mounted in housing 21 and such resistance banks are designed to introduce a factor in determining the rating in order to give a greater or lesser rating significance to the volume with respect to the weight than that for which the circuit is normally set.

The circuit herein is designed to place resistance banks R$a$V and R$a$W in series with the series connected resistance banks RB-1, RB-2 and RB-3 or with resistance 51 of the weight scale respectively. To this end the switch 104 desirably has a pair of movable contact arms 309, 311 ganged together to move in unison and insulated from each other, each switch arm desirably having a set of contacts 312 and an additional contact 312' associated therewith. Resistance banks R$a$V and R$a$W each desirably comprises a plurality of resistances, only two of which are shown, resistances R$a$V-2 and R$a$V-3 being at the left and resistances R$a$W-2 and R$a$W-3 being at the right. In the normal position of the contact arms 309, 311 of switch 104, such arms are engaging a contact 312'. The contact 312' associated with the R$a$V resistances is connected to the two contacts 312 to the right and is also connected by lead 313 to one end of resistances R$a$V-2 and R$a$V-3, the other ends of said resistances being connected to an associated contact 312 to the left of contact 312' and contact 312' is also connected by leads 313 and 314 to fixed contact 315 of discriminator relay 121. Similarly, the contact 312' associated with the R$a$W resistances is connected to the two contacts 312 to the left and is also connected by lead 316 to one end of resistances R$a$W-2 and R$a$W-3, the other ends of said resistances being connected to an associated contact 312 to the right of contact 312', and contact 312' associated with the R$a$W resistances is also connected by leads 316 and 317 to fixed contact 318 of discriminator relay 121.

Each of the resistances in resistance banks R$a$V and R$a$W is of such value that when placed in series with the volume resistance banks or the weight resistance, they will add a resistance of ohmic value proportional to the logarithm of the factor which is to be introduced. The movable arm 309 is connected by lead 321 to one end of resistance 322 and thence by lead 323 to one of the inputs of servo-amplifier 324. The movable arm 311 is connected by lead 325 to one end of resistance 326, which is identical in value to resistance 322 and thence by lead 327 to the other input of servo-amplifier 324. Desirably, an impedance matching resistance 328 is connected across the input leads 323 and 327 of said servo-amplifier 324 for optimum operation thereof. The other ends 329 of resistances 322 and 326 are connected together by common lead 330 which is connected by lead 331 to A. C. main 135.

The power input of servo-amplifier 324 is connected to A. C. mains 135 and 142 by leads 332 and 333 and the output of the servo-amplifier 324 is connected by lead 334 to a servo-motor 335, amplifier 324 and motor 335 also being of the type previously described. Motor 335 is connected by lead 336 to movable arm 337 of discriminator relay 121 to energize such motor when said movable arm 337 engages the associated fixed contact 338 which is connected by lead 339 to A. C. main 135.

The shaft of motor 335 carries switch arm 340 which, upon rotation of the servo-motor 335 in a counter-clockwise direction will actuate the movable arm 341 of volume cost switch 342 which is normally in open position. Arm 341 is connected by lead 343 to fixed contacts 344 and 345 of relay 346 and also by lead 347 to the junction 348 between leads 224, 225 and 226. In addition, arm 341 is connected through leads 343 and 349 to fixed contact 351 of volume cost relay 124. Movable arm 350 of relay 346 is connected by lead 352 to one side of the coil 353 of discriminator relay 121, the other side of said coil being connected by lead 354 to A. C. main 135. Arm 350 is also connected by lead 355 to wiper arm 213 associated with disc 204 of timer 201. Movable arm 356 of relay 346 is connected by lead 357 to movable arm 358 of volume cost relay 124 and also to one side of the coil 359 of said relay 124, the other side of said coil being connected by lead 361 to A. C. main 135. Desirably an indicating lamp, such as a neon light 362 is connected across said coil 359 to indicate when the latter is energized.

Fixed contact 363 of switch 342 is connected by lead 364 to one side of said coil 365 of relay 346, the other side of said coil being connected by leads 366 and 331 to A. C. main 135. Movable arm 367 of volume cost relay 124 which is normally engaging fixed contact 368 when said relay is not energized, is connected by lead 369 to A. C. main 135 and by lead 371 to movable arm 372 of said relay 124. Contact 368 is connected by lead 194 to one side of the coil 195 of weight cost relay 264, the other side of said coil being connected by lead 196 to wiper arm 214 associated with disc 205. Desirably, an indicating device such as a neon lamp 197 is connected across coil 195 to indicate when the latter is energized. Fixed contact 373 associated with movable arm 372 is connected by leads 374 and 375 to fixed contact 376 of cost zero relay 245, by leads 374 and 377 to fixed contact 378 of weight cost relay 264, and by leads 374, 377 and 379 to servo-motor 381 to energize the latter, the contact arm 198 associated with fixed contact 378 being connected by lead 199 to A. C. main 135. Movable arm 370 of cost zero relay 245 is connected by lead 380 to one end of zeroing resistance 381, the other end of which is connected to A. C. main 142.

Movable arm 382 of volume cost relay 124 is connected by leads 383 and 384 to fixed contact 385 of cost zero relay 245, by leads 383, 386 to fixed contact 387 of weight cost relay 264 and by lead 388 to wiper arm 389 which mounts a contact shoe 391 engaging the resistance 392 of cost indicating drum 97, said drum being substantially identical to drums 101 and 102. One end of resistance 392 is connected to contact ring 393 mounted on said drum and insulated therefrom and said contact ring 392 is engaged by the roller 394 mounted at the end of wiper arm 395 which is connected by lead 396 to common lead 397 which connects one end of a plurality of resistances "Z" of zone switch 105, any one of which may be placed in circuit to multiply the cost indication by a predetermined multiple in order to give the direct reading for various zones.

As shown in Fig. 10, the zone switch 105 illustratively has three resistances designated Z-2, Z-3 and Z-4, the terminals 398 of which may be selectively engaged by the switch arm 399 which normally engages terminal 400 connected to lead 397, said arm 399 being connected by lead 401 to one end of resistance 402.

Lead 401 is also connected by lead 403 to one of the inputs of servo-amplifier 404, the other input which is connected by lead 405 to one end of resistance 406 which is identical to resistance 402 and lead 405 is also connected by lead 407 to one end of balancing resistance 408, the other end of which is connected by lead 409 to A. C. main 142. The other ends 411 of resistance 402 and 406 are connected by lead 412 which is connected by lead 413 to A. C. main 135.

The power input to servo-amplifier 404 is connected by leads 414 and 415 to A. C. mains 135 and 142 respectively, and the output of the servo-amplifier 404 is connected by lead 416 to servo-motor 381, the latter driving drum 97 by means of shaft 417, the servo-amplifier 404 and servo-motor 381 being of type previously described.

DETERMINATION OF RESISTANCE MAGNITUDES

Illustrative values will now be determined for the resistances utilized in the equipment assuming that the largest object to be measured is five inches by four inches by four inches.

If the ohmic value of each of the resistance banks RB-1, RB-2 and RB-3 is a function of the logarithm of a corresponding dimension classification, the sum of the series connected resistance banks RB-1, RB-2 and RB-3 will be a function of the product of the three dimensions or the volume classification of the object which may be read as such on drum 101 or with corresponding monetary value on drum 97.

As appears in Tabulation I, hereinafter set forth, the second column is the value of the dimension classification in the first column multiplied by ten so that the logarithm of all numbers may be greater than zero. The third column is the logarithm (to three decimal places) of each value. For convenience in the construction of the equipment so that resistances of common values may be used, the logarithms in column three are multiplied by one thousand to secure column four.

*Tabulation I*

| Dimension Classification | Value | Logarithm | Resistance |
|---|---|---|---|
| 1 | 10 | 1.000 | 1,000 |
| 2 | 20 | 1.301 | 1,301 |
| 3 | 30 | 1.477 | 1,477 |
| 4 | 40 | 1.602 | 1,602 |
| 5 | 50 | 1.699 | 1,699 |
| 6 | 60 | 1.778 | 1,778 |
| 7 | 70 | 1.845 | 1,845 |
| 8 | 80 | 1.903 | 1,903 |
| 9 | 90 | 1.954 | 1,954 |
| 10 | 100 | 2.000 | 2,000 |

With resistances having values thus determined, if the unit of measurement is considered to be inches and if an object 2 inches by 2 inches by 2 inches is being measured, the combined value of the logarithms related to such units of measurement will be 3.903 and the total value of resistance banks RB-1, RB-2 and RB-3 in circuit will be 3,903 ohms. If the object is 5 inches by 4 inches by 4 inches, the total resistance in circuit will be 4,903 ohms.

The drum 101 is so calibrated that each run 150 of the resistance wire 151 when engaged by the wiper arm 145 will place in circuit a resistance of value equal to one predetermined volume.

The resistance value of each run is calibrated as follows: as the volume resistance banks RB-1, RB-2 and RB-3 and drum resistance 151 in series therewith will form one arm of a Wheatstone bridge, designated the volume bridge and the balancing resistance 171 another arm, in order for the bridge to balance the sum of the volume resistance banks and drum resistance 251 must equal the value of balancing resistance 271.

As the largest object to be measured is illustratively 5 inches by 4 inches by 4 inches, the maximum combined resistance of the volume resistance banks is 4,903 ohms. The balancing resistance 171 is made of 4,903 ohms and consequently for the bridge to balance the value of the drum resistance 151 in circuit must be the difference between 4,903 ohms and the value of the volume resistance in circuit.

The following tabulation may be calculated.

*Tabulation II*

| Volume | Sum of Resistance, Banks RB-1, RB-2, RB-3 | Drum Resistance |
|---|---|---|
| 8 | 3,903 | 1,000 |
| 16 | 4,204 | 699 |
| 24 | 4,380 | 523 |
| 32 | 4,505 | 398 |
| 40 | 4,602 | 301 |
| 48 | 4,681 | 222 |
| 56 | 4,748 | 155 |
| 64 | 4,806 | 97 |
| 72 | 4,857 | 46 |
| 80 | 4,903 | 0 |

Thus successive runs on the drum 101 are of values from 1,000 ohms to 0 ohm and the periphery of the drum is marked with volume indications of 8 to 80 in increments of 8, corresponding to the successive runs. It is of course to be understood that for volumes falling between those above enumerated, additional runs 150 would be provided on drum 101 of appropriate value. Thus for a volume of 10 cubic inches for an object 5 inches by 2 inches by 1 inch as the combined value of resistance banks RB-1, RB-2 and RB-3 would be 4,000 ohms, a run 150 of 4,903–4,000 or 903 ohms would be provided between the runs associated with 8 and 16 cubic inches.

In order that the drum 101 may be rotated to indicate zero, in the manner hereinafter to be described, the zeroing resistance 233 is illustratively 2,000 ohms in value and an additional run 150 is provided on drum 101 calibrated as zero which places in circuit resistance of ohmic value equal to the difference between balancing resistance 171 and zeroing resistance 233 or 2,903 ohms to balance the volume bridge.

To calibrate the value of the resistances on the scale 42, let it be assumed that 8 cubic inches of volume shall have the same rating as one pound of weight. To have a resistance in circuit on the drum 42 for one pound of weight, which is equivalent to a volume of 8 cubic inches, the value of the weight resistance 51 on drum 42 placed in circuit when engaged by the associated wiper arm 48 would have to be 3,903 ohms. To this end the runs of resistance wire on drum 42 are so constructed that they are successively of resistance values of from 3,903 to 4,903 ohms for from one pound to ten pounds respectively, which are equivalent to volumes of from 8 to 80 cubic inches respectively.

As the resistance 51 on the weight scale 24 and the resistance 267 on drum 102 which is substantially identical to drum 101, form one arm of a Wheatstone bridge designated the weight bridge, and the balancing resistance 291, another arm of such bridge, in order for the weight bridge to balance, the sum of the weight resistance and the drum resistance 267 must equal the value of balancing resistance 291.

As the weight of the largest object to be measured is illustratively 10 pounds, the maximum resistance of the drum resistance 267 is 4,903 ohms. The balancing resistance 291 is made of 4,903 ohms and consequently for the weight bridge to balance the drum resistance 267 in circuit must be the difference between 4,903 ohms and the value of weight resistance 51 in circuit.

The following tabulation may be calculated.

*Tabulation III*

| Weight | Weight Resistance | Drum Resistance |
|---|---|---|
| 1 | 3,903 | 1,000 |
| 2 | 4,204 | 699 |
| 3 | 4,380 | 523 |
| 4 | 4,505 | 398 |
| 5 | 4,602 | 301 |
| 6 | 4,681 | 222 |
| 7 | 4,748 | 155 |
| 8 | 4,806 | 97 |
| 9 | 4,857 | 46 |
| 10 | 4,903 | 0 |

Thus successive runs on drum 102 are of values from 1,000 ohms to 0 ohm and the periphery of the drum is marked with weight indication of 1 to 10 pounds in increments of one corresponding to the successive runs.

In order that the drum 102 may be rotated to indicate zero in the manner hereinafter to be described, the zeroing resistance 305 is also 2,000 ohms in value and an additional run is provided on drum 102 calibrated as zero which places in circuit resistance of ohmic value equal to the difference between balancing resistance 291 and zeroing resistance 305 or 2,903 ohms to balance the weight bridge.

If the charge to be made is based on zones and the basic charge for a one pound package of volume of eight cubic inches or less in zone one is five cents, it may be doubled or trebled for zones 2 and 3, for example, by adding either the resistance Z-2 or Z-3 in series with the series connected resistance banks RB-1, RB-2 and RB-3 or with weight resistance 51 as the case may be by movement of switch arm 399. The resistances Z-2 and Z-3 are of value to increase the total resistance to the desired amount so that drum 97 will rotate to give a reading which is double or triple the basic reading and such resistances have a value of 301 ohms and 477 ohms respectively which are proportional to the logarithms of the zone multipliers.

To determine the values of the resistance 392 on drum 97 and the balancing resistance 408, the value of the largest zone multiplier, i. e., 477 ohms, is added to the ohmic value of either the volume resistance banks or weight resistance bank for the volume or weight of the largest package that can be measured by the equipment, which as has been heretofore shown is equal to 4,903 ohms.

Thus, the balancing resistance 408 is made to have a value of 4,903 ohms plus 477 ohms or 5,380 ohms. Successive runs of resistance 392 on drum 97 for a weight of one pound or 8 cubic inches must be 5,380 minus 3,903 or 1,477 ohms and for weights of 2, 3 and 4 pounds and volumes of 16, 24 and 32 cubic inches, the values of the successive runs must be 1,176, 1,000 and 875 ohms respectively and the periphery of the drum is calibrated in increments of five cents, i. e., five, ten, fifteen, twenty, etc. associated with the respective runs. In addition, the cost drum has a run calibtraed as zero designed to put resistance of 3,380 ohms in circuit which is equal to the difference between balancing resistance 408 and zeroing resistance 381 which illustratively has a value of 2,000 ohms so that the cost bridge will balance.

Where greater volume than the illustrative 8 cubic inches is to have a rating equal to one pound of weight as for example, when twice that volume or 16 cubic inches is to have the same rating as one pound, it is merely necessary to add resistance in series with weight resistance 51, the value of which is related to the logarithm of two. As the logarithm of two is .301, this number is desirably multiplied by 1,000 to give a value of 301 ohms which is the value of resistance R$a$W-2 so that the total resistance of the weight resistance plus resistance R$a$W-2 would be 4,204 ohms or that caused by a weight of two pounds. Similarly, if it is desired to change the ratio to 24 cubic inches to one pound, it is merely necessary to multiply by three and the value of resistance R$a$W-3 is 477 ohms.

Where a lesser volume than the illustrative 8 cubic inches is to have a rating equal to one pound of weight, as for example, where up to but not including twice the weight or two pounds is to have the same rating as 8 cubic inches, it is merely necessary to add resistance in series with the volume resistance banks RB-1, RB-2 and RB-3, the value of which is related to the logarithm of two. Thus the value of resistance R$a$V-2 is 301 ohms. For a ratio of up to three pounds to 8 cubic inches, resistance R$a$V-3 is 477 ohms.

OPERATION

In order to determine the classification of an object, including its volume, weight and density and the cost to be charged for shipping the same, the object or package is first placed on platform 66 adjacent the origin "0" of the three dimensional system of rectangular coordinates and the measuring members 15, 73 and 74 are moved to engage the top, end and side of the package respectively. Assuming, for purposes of illustration, that the package is 2 inches by 2 inches by 2 inches and weighs one pound, and the ratio switch 104 and zone switch 105 are in neutral position, as shown in Fig. 13, movement of the measuring members 73, 74 and 75 will cause the associated wiper arms 88, 89 and 90 to engage the runs 112 of resistance wire 111 of resistance banks RB-1, RB-2 and RB-3 respectively associated with such dimensions to tap off resistances of value of 1,301 ohms on each resistance bank which is related to the dimension of two inches as set forth in Tabulation I. By reason of the series connection of such resistance banks RB-1, RB-2 and RB-3, the total value of the resistances will be 3,903 ohms. The weight of the package on platform 66 will cause the contact shoe 49 on wiper arm 48 to engage a run 251 of resistance wire associated with such weight of one pound, thereby to place a resistance of 3,903 ohms in circuit.

When the frame 65 carried by the weighing scale is at rest, the operator may actuate start switch 228 mounted on the front panel of the housing to bring movable contact arm 229 into engagement with fixed contact 227. As a result, a circuit will be completed from A. C. main 135, lead 209, to one side of the timer motor and from the other side of the motor through leads 225, 226, fixed contact 227, movable arm 229, lead 218 to A. C. main 142.

Energization of motor 208 will, through shaft 207, rotate timer discs 202, 203, 204, 205 and 206 in a clockwise direction as shown in Fig. 13. After a short interval of time the notch 216 in disc 202 will move past wiper arm 211 which then engages the periphery of disc 202 to complete a holding circuit to the motor 208 so that when switch 228 is opened the motor 208 will remain energized. The holding circuit is from A. C. main 135, lead 209 to one side of motor 208 and from the other side of the motor through leads 225, 224, wiper arm 211, disc 202, conducting shaft 207, disc 206, wiper arm 215 which continuously engages disc 206, leads 217 and 218 to A. C. main 142. Further rotation of the shaft 207 by motor 208 will cause the notch 216 in disc 203 to move past wiper arm 212 which then engages the periphery of disc 203. As a result, a circuit will be completed to the coils 221 and 222 of volume relay 117 and weight relay 223 respectively. The circuit is from A. C. main 142, leads 218, 217, wiper arm 215, disc 206, shaft 207, disc 203, wiper arm 212, leads 219 and 220 to one side of coils 221 and 222, the other side of said coils being connected to A. C. main 135.

Energization of the coil 221 of volume relay 117 will bring movable contact arms 116 and 186 thereof into engagement with fixed contacts 143 and 192 respectively. As a result, a circuit will be completed from A. C. main 142, lead 141 through the series connected volume resistance banks RB-1, RB2 and RB-3, lead 115, contact arm 116, contact 143, lead 144 to wiper arm 145 engaging volume drum resistance 151 and from contact ring 152 to which the end of resistance 151 is connected, wiper arm 175, leads 174, 178 to one end of resistance 179. Thus, the volume resistance banks RB-1, RB-2 and RB-3 and the drum resistance 251 will be connected in series. The movement of contact 186 against fixed contact 192 will complete a circuit from A. C. main 135, lead 193, contacts 192, 186, lead 185 to servo-motor 162 so that the latter is in condition for energization. As has been previously pointed out, with a package having a dimension of 2 inches by 2 inches by 2 inches or a volume of 8 cubic inches, the combined resistance values of the series connected resistance banks RB-1, RB-2 and RB-3 will be 3,903 ohms. As the resistance 171 has a value of 4,903 ohms, in order for the volume bridge to be in balance the value of the drum resistance 151 in circuit must be the difference between 4,903 ohms and 3,903 ohms or 1,000 ohms.

If the value of the drum resistance 151 in series with the volume resistances RB-1, RB-2 and RB-3 is greater or less than 1,000 ohms, it is apparent that the volume bridge will not be in balance and current will flow through leads 167 and 173 into servo-amplifier 163. The current flowing into the servo-amplifier will be amplified and fed to servo-motor 162 to energize the latter and motor 162 through shaft 161 will rotate volume drum 101. The drum 101 will rotate until wiper arm 145 thereof engages the run 150 of resistance wire 151 associated with the resistance of 1,000 ohms, at which time the volume bridge will be in balance and no current will flow into the servo-amplifier 163. Consequently, servo-motor 162 will be deenergized and the drum 101 will stop rotating. The drum is so calibrated that when it has thus stopped rotating, a suitable pointer will indicate a value of 8 cubic inches which is correlated with the resistance of 1,000 ohms.

Energization of the coil 222 of weight relay 223 which, as we have seen, occurs simultaneously with the energization of volume relay 117, will bring movable arms 257 and 296 thereof into engagement with fixed contacts 272 and 301 respectively. As a result, a circuit will be completed from A. C. main 142, lead 254 to wiper arm 63 which is engaging contact ring 56 on scale 24, lead 55 to wiper arm 48 which is engaging resistance wire 51 and from the end of resistance wire 51, leads 255, 256, contact arm 257, contact 272, lead 271 to wiper arm 269 engaging weight drum resistance 267 and from contact ring 275 to which the end of resistance 267 is connected, wiper arm 277 and lead 278 to one end of resistance 279. Thus the weight resistance 51 and the drum resistance 267 will be connected in series. The movement of contact arm 296 against fixed contact 301 will complete a circuit from A. C. main 135, lead 303, contacts 301 and 296, lead 295 to servo-motor 282 so that the latter is in condition for energization.

As has been previously pointed out, with a package having a weight of one pound, the value of resistance 51 in circuit will be 3,903 ohms. As the balancing resistance 291 has a value of 4,903 ohms, in order for the weight bridge to be in balance, the value of the drum resistance 267 in circuit must be the difference between 4,903 ohms and 3,903 ohms or 1,000 ohms. If the value of the drum resistance 267 in series with the weight resistance 51 is greater or less than 1,000 ohms, it is apparent that the weight bridge will not be in balance and current will flow through leads 287 and 288 into servo-amplifier 283. The current flowing into the servo-amplifier will be amplified and fed to servo-motor 282 to energize the latter and servo-motor 282, through shaft 281, will rotate weight drum 102. The drum 102 will rotate until wiper arm 269 thereof engages the run 150 of resistance wire 267 associated with the resistance of 1,000 ohms, at which time weight bridge will be in balance and no current will flow into the servo-amplifier 283. Consequently, servo-motor 282 will be deenergized and the drum 102 will stop rotating. The drum 102 is so calibrated that when it has thus stopped rotating, a suitable pointer will indicate a weight value of one pound which is correlated with the resistance of 1,000 ohms.

At this time the circuit has operated to give a reading of volume and weight on drums 101 and 102 respectively.

Continued rotation of shaft 207 by motor 208 in a clockwise direction as shown in Fig. 13 will cause the notch 216 in disc 203 to reach wiper arm 212 and break the circuits to the coils 221 and 222 of volume relay 117 and weight relay 223 respectively. Deenergization of such relays will cause the movable contact arms thereof to move away from the associated fixed contacts to break the circuit from resistance banks RB-1, RB-2 and RB-3 to drum resistance 151 and from weight resistance 51 to drum resistance 267. As a result of the moving of arm 186 of relay 117 away from fixed contact 192 and of arm 296 of relay 223 away from fixed contact 301, the circuit from A. C. main 135 to the servo-motors 162 and 282 respectively will be broken. Consequently there is no likelihood of creeping of said servo-motors due to stray currents in the circuit which would change the readings on the associated drums 101 and 102.

Substantially simultaneously with the deenergization of relays 117 and 223, the notch 216 in disc 204 will move past wiper arm 213 which then engages the periphery of disc 204. As a result, a circuit will be completed from A. C. main 142, leads 218, 217, wiper arm 215, disc 206, conducting shaft 207, disc 204, wiper arm 213, leads 355, 352 to one side of the coil 353 of discriminator relay 121 and from the other side of said coil through lead 354 to A. C. main 135. Energization of coil 353 of discriminator relay 121 will bring movable contact arms 119, 261 and 337 into engagement with fixed contacts 315, 318 and 338 respectively. Movement of contact 119 against fixed contact 315 will connect one side of the series connected resistance banks RB-1, RB-2 and RB-3 through leads 115, 118, contacts 119, 315, lead 314 to common lead 313 of ratio switch 104 which is connected to fixed contact 312' of said switch and thence through switch arm 309 normally engaging said contact 312' and lead 321 to one end of resistance 322. Movement of arm 261 of relay 121 against fixed contact 318 will complete a circuit from one end of weight resistance 51, leads 255, 256, 258, 259, contacts 261, 318, lead 317 to common lead 316 of ratio switch 104 which is connected to the associated fixed contact 312' and thence from switch arm 311 normally engaging said contact, lead 325 to one end of resistance 326.

As resistance banks RB-1, RB-2 and RB-3 and weight resistance 51 are connected by leads 141 and 254 respectively to A. C. main 142 and as the resistances 322 and 326 have their ends 329 connected by lead 331 to A. C. main 135, the resistances 322 and 326, resistance banks RB-1, RB-2 and RB-3 and weight resistance 51 will form a Wheatstone bridge designated the discriminator bridge, the output of which is connected through leads 323 and 327 to servo-amplifier 324.

As the resistance of the volume resistance banks RB-1, RB-2 and RB-3 and the weight resistance 51 are both equal to 3,903 ohms, as above described, inasmuch as the object has a volume of 8 cubic inches and weighs one pound, the discriminator bridge will be in balance and hence no current will flow into the servo-amplifier 324 and the servo-motor 335 will remain deenergized. Consequently, the switch 342 will remain open as the switch arm 340 of servo-motor 335 will not engage movable contact arm 341 of said switch to bring the latter into engagement with fixed contact 363.

As a result, the volume cost relay 124 will remain deenergized when the discriminator bridge is balanced for no current will flow through the coil 359 of said relay. Under these conditions the movable contact arms 358, 372 and 382 of relay 124 will remain spaced from the associated fixed contacts 351, 373 and 123 and the movable contact arm 367 will remain in engagement with fixed contact 368.

Continued rotation of shaft 207 by motor 208 in a clockwise direction will cause the notch 216 in disc 204 to reach wiper arm 213 thereby to break the circuit to the coil 353 of the discriminator relay 121 to deenergize the latter. As a result, the circuit from volume resistance banks RB-1, RB-2 and RB-3 and weight resistance 51 to resistances 322, 326 of the discriminator bridge will be broken, and the movement of arm 337 away from fixed contact 338 will break the circuit from A. C. main 135 to servo-motor 335 to prevent creeping of the latter.

Immediately after the deenergization of the discriminator relay, continued rotation of shaft 207 will move the notch 216 in disc 205 past wiper arm 214 which then engages the periphery of disc 205. As a result, a circuit will be completed to coil 195 of the weight cost relay 264. This circuit is from A. C. main 142, leads 218, 217, wiper arm 215, disc 206, conducting shaft 207, disc 205, wiper arm 214, lead 196 to one side of coil 195 of weight cost relay 264 and from the other side of said coil through lead 194 to contact 368 engaged by arm 367 and thence by lead 369 to A. C. main 135.

Energization of the coil 195 of weight cost relay 264 will bring movable contact arms 198 and 263 thereto into engagement with fixed contacts 378 and 387 respectively. Movement of contact arm 263 against contact 387 will connect weight resistance 51 in series with cost drum resistance 392, the circuit being from A. C. main 142, lead 254, wiper arm 63, contact ring 56, lead 55, wiper arm 48, resistance 51, leads 255, 256, 258, 262, contact arm 263, contact 387, leads 386, 383, 388, wiper arm 389 engaging drum resistance 392, contact ring 393 to which said drum resistance 392 is connected, wiper arm 395, lead 396 to common lead 397 of zone switch 105, contact 400, contact arm 399 and lead 401 to one end of resistance 402.

As the weight resistance 51 is connected to A. C. main 142 by lead 254; as one end of resistance 406 is connected by lead 407 to one end of balancing resistance 408, the other end of which is connected by lead 409 to A. C. main 142, and as the other end of resistances 402 and 406 are connected to A. C. main 135 by lead 413, the weight resistance 51 and drum resistance 392 will form one arm of a Wheatstone bridge designated the cost bridge and balancing resistance 408 will form another arm of said bridge, the output of which is fed through leads 403 and 405 to servo-amplifier 404. As the package has a weight of one pound, which is equivalent to a resistance of 3,903 ohms, if the value of cost drum resistance 392 in circuit is greater or less than 1,477 ohms, it is apparent that the cost bridge above described will not be in balance and current will flow through leads 403, 405 into the servo-amplifier 404. This current will be amplified and fed to servo-motor 381 to energize the latter, said servo-motor 381 being placed in condition for energization by the closing of contacts 198, 378 of weight cost relay 264. Energization of motor 381 will, through shaft 417 rotate cost drum 97. The drum 97 will rotate until wiper arm 389 thereof engages the run of resistance wire 392 associated with a resistance of 1,477 ohms at which time the cost bridge will be in balance and no current will flow into servo-amplifier 404. Consequently, servo-motor 381 will be deenergized and drum 97 will stop rotating. The drum is so calibrated that when it has thus stopped rotating, a suitable pointer will indicate a cost of five cents which is the charge for one pound which is correlated with the resistance of 1,477 ohms.

Continued rotation of shaft 207 by motor 208 in a clockwise direction will cause the notch 216 in disc 205 to reach wiper arm 214 to break the circuit to the coil 195 of the weight cost relay 264 to deenergize such relay. As a result, the circuit from weight resistance 51 to the cost bridge resistance 402 will be broken. In addition, the movement of arm 198 away from fixed contact 378 will break the circuit from A. C. main 135 to servo-motor 381 to avoid any possible creeping of the latter which would vary the cost reading.

After the disc 202 has made substantially a complete revolution, the notch 216 therein will reach the wiper arm 211 to break the circuit to motor 208 and the equipment thereupon will be rendered inoperative with the drums 101, 102 and 97 indicating the volume, weight and cost of the package.

If the package should have a volume of 8 cubic inches and the weight should be, for example, 2 pounds, the system would function in the manner previously described so that the drum 101 would rotate to indicate a volume of 8 cubic inches and the drum 102 would rotate to indicate a weight of 2 pounds. As the value of the weight resistance 51 is 4,204 ohms for a weight of two pounds, and the value of the volume resistances is 3,903 ohms for 8 cubic inches, the discriminator bridge would be unbalanced and current would flow into the servo-amplifier 324. Due to the fact that the weight resistance is greater than the volume resistance, the weight current will be greater than that of the volume current and the servo-motor 335 will be rotated in a clockwise direction so that the switch arm 340 thereof will have no effect on the movable arm 341 of switch 342. As the result, the volume cost relay 359 will remain deenergized and the weight cost relay coil 195 will be energized as previously described so that the weight resistance 51 together with drum resistance 392 will form one of the arms of the cost bridge, also as previously described.

Consequently, the drum 97 will rotate until wiper arm 389 engages a run of resistance wire 392 associated with a resistance of 1,176 ohms to balance the cost bridge at which time a cost indication of ten cents will be indicated on drum 97. If the object being measured should be 2 inches by 2 inches by 4 inches or 16 cubic inches and the weight should be one pound, the drums 101 and 102 would indicate the volume of 16 cubic inches and a weight of one pound respectively as previously described. When the volume resistance banks RB-1, RB-2 and RB-3 which have a value of 4,204 ohms for a volume of 16 cubic inches and the weight resistance 51 which has a value of 3,903 ohms for a weight of one pound are placed in the discriminator bridge as previously described, the current through the volume resistances would be greater than that through the weight resistance. Consequently, the discriminator bridge would be unbalanced, but this time the current into the servo-amplifier 324 would be in direction to rotate the servo-motor 335 in a counterclockwise direction and such arm 340 would engage contact arm 341 to move the latter into engagement with fixed contact 363. As a result, a circuit would be completed from A. C. main 142, leads 218, 217, wiper arm 215, disc 206, conducting shaft 207, disc 202, wiper arm 211, leads 224, 347, 343, contact arm 341, contact 363, lead 364, coil 365 of relay 346, leads 366 and 331 to A. C. main 135 thereby to energize coil 365. Energization of coil 365 of relay 346 will bring movable contact arms 350 and 356 into engagement with fixed contacts 344 and 345 respectively.

Engagement of contact arm 356 with fixed contact 345 will complete a circuit from A. C. main 142, leads 218, 217, wiper arm 215, disc 206, conducting shaft 207, disc 202, wiper arm 211, leads 224, 347 to contact 345 and thence through contact 356, lead 357 to one side of coil 359 of volume cost relay 124 and from the other side of said coil by lead 361 to A. C. main 135. Energization of coil 359 of volume cost relay 124 will bring movable contact arms 358, 372 and 382 into engagement with fixed contacts 351, 373 and 123 respectively, and will move movable arm 367 away from the fixed contact 368 to break the circuit to the coil 195 of weight cost relay 264. Movement of contact arm 372 against fixed contact 373 will complete a circuit from A. C. main 135 to servo-motor 381 to place the latter in condition for energization, the circuit being from main 135, leads 369, 371, contacts 372, 373, leads 374, 377, 379 to motor 381. Movement of arm 382 against fixed contact 123 will complete a circuit from volume resistances RB-1, RB-2 and RB-3, leads 115, 118, 122, contacts 123, 382, lead 388 to wiper arm 389 of resistance 392 on cost drum 97 and from contact ring 393 to which one end of resistance 392 is connected, wiper arm 395, leads 396, 397, contact 400 of zone switch 105 which is engaged by movable arm 399, lead 401 to one end of resistance 402. As the adjacent end of resistance 406 is connected by lead 407 to one end of balancing resistance 408, the other end of which is connected by lead 409 to A. C. main 142, the volume resistance banks RB-1, RB-2 and RB-3 and drum resistance 392 will now form one arm of the cost bridge and balancing resistance 408 will form another arm of the cost bridge.

If the sum of the volume resistances RB-1, RB-2 and RB-3, which is 4,204 ohms for a volume of 16 cubic inches, and the drum resistance 392 in circuit, is greater or less than 5,380 ohms, which is the value of the balancing resistance 408, the cost bridge will be out of balance and current will be fed to servo-amplifier 404. As a result, servo-motor 381 will be energized to rotate the drum 97 until wiper arm 389 thereof engages a run of resistance wire 392 associated with the resistance of 1,176 ohms at which time the cost bridge will be in balance and no current will flow into the servo-amplifier 404.

Consequently, servo-motor 381 will be de-energized and drum 97 will stop rotating. The drum is so calibrated that when it has thus stopped rotating, a suitable pointer will indicate a cost of ten cents correlated with the volume of 16 cubic inches.

If the notch 216 of disc 204 should move into alignment with wiper arm 213 while arm 340 is engaging switch arm 341 and retaining the latter against fixed contact 363, although the circuit to the coil 353 of the discriminator relay 121 would be broken by reason of the opening of the circuit between disc 204 and wiper arm 213, the relay 346 would remain energized thereby maintaining the volume cost relay 124 in circuit by reason of closed contacts 345, 356, so that upon the next weighing and measuring cycle, the volume cost relay 124 would be energized regardless of whether volume or weight was to be the controlling factor. To prevent this erroneous reading, the relay 346 has the movable contact arm 350 and fixed contact 344. When arm 350 engages contact 344, even if notch 216 in disc 204 is aligned with wiper arm 213, a circuit will still be completed to the coil 35 of discriminator relay 121. This circuit is from A. C. main 142, leads 218, 217, wiper arm 215, disc 206, conducting shaft 207, disc 202, wiper arm 211, leads 224, 347, 343, contact 344, contact arm 350, lead 352 to one side of coil 353 and from the other side of said coil through lead 354 to A. C. main 135.

As the discriminator relay will thus remain energized, the motor 335 will likewise remain energized inasmuch as the circuit is completed from A. C. main 135 through closed contacts 337, 338 to said motor 335 and from resistance banks RB-1, RB-2 and RB-3 and weight resistance 51 to the discriminator bridge which will remain unbalanced by reason of the predominating volume current. Consequently, motor 335 will move arm 340 until it no longer engages arm 341 at which time the circuit to coil 365 of relay 346 will be broken and as a result of the deenergization of such relay, arms 350 and 356 will move away from fixed contacts 344 and 345 to break the circuit to the coils 353 and 359 of the discriminator relay 121 and volume cost relay 124.

Upon movement of contact arm 358 against fixed contact 351 of the volume cost relay 124 with the initial energization of the latter, a holding circuit will be provided for the coil 359 of said relay. This circuit is from A. C. main 142, leads 218, 217, wiper arm 215, disc 206, shaft 207, disc 202, wiper arm 211, leads 224, 347, 349, contacts 351, 358 through coil 359 and leads 361 to A. C. main 135. As a result, the volume cost relay will remain energized regardless of the deenergization of the discriminator relay or relay 346 and not until the cycle has been completed and wiper arm 211 no longer engages disc 202 will the circuit to coil 359 of volume cost relay 124 be broken.

In order to determine the density, or the relation of weight to volume of the package being shipped, after it has been classified as above described, it is merely necessary for the operator to close density switch 127. This will connect resistance banks RB-1, RB-2 and RB-3 through lead 125 and movable arm 126 of density switch 127 to fixed contact 128 and resistance 131. The weight resistance 51 will be connected through leads 255, 265 to movable arm 266 of said switch and thence to fixed contact 137 and resistance 133. As a result, a Wheatstone bridge designated the density bridge will be formed, the output of which will be the difference between the weight current and the volume current and such output will be indicated on meter 103 as a factor of density.

If the currents through the weight and volume resistance should be identical, the density bridge would be in balance and under these conditions the meter is illustratively designed to give an arbitrary indication of "one" which would indicate that the weight and volume bear a predetermined relation to each other, i. e., 8 cubic inches to one pound. If, for example, the weight current should be greater than the volume current, the meter will give an indication of a density greater than one and if the volume current should be greater than the weight current, the meter would give an indication of weight less than one.

The operation thus far described has been with respect to the predetermined relation of 8 cubic inches to one pound with a charge of five cents for each 8 cubic inches or one pound. Where it is desired to allow the shipper to transport double the volume for a given weight for the same price, that is, 16 cubic inches for five cents, before start switch 228 is closed, it is merely necessary for the operator to adjust ratio switch 104 so that switch arm 311 thereof engages the contact 312 associated with resistance R$a$W-2 which has a value of 301 ohms. This will place such resistance in series with the weight resistance 51 when the latter is switched into the discriminator bridge circuit as previously described.

Thus, for example, if the volume is 16 cubic inches and the weight is one pound, the value of resistance banks RB-1, RB-2 and RB-3 is 4,204 ohms and the value of the weight resistance 51 will be 3,904 ohms. Resistance R$a$W-2 which has a value of 301 ohms will be in series with the weight resistance of 3,903 ohms making a total resistance of 4,204 ohms. As a result, the discriminator bridge will be in balance even though the volume of the object is 16 cubic inches and its weight is one pound. With the bridge in balance, upon engagement of wiper arm 214 with disc 205 as previously pointed out and energization of weight cost relay 264, the weight resistance 51 alone will thereupon be connected into the cost bridge and the cost drum 97 will rotate until it places a resistance in circuit having a value of 1,477 ohms which will give an indication of five cents.

If the volume should be greater than 16 cubic inches such as, for example, 24 cubic inches and the weight still should be one pound, with the ratio switch arm 311 still engaging the contact associated with resistance R$a$W-2, the volume resistance bank would have a value of 4,903 ohms, whereas the weight resistance 51 plus resistance R$a$W-2 will have a total value of 4,204 ohms, thereby unbalancing the bridge in the manner previously described so that upon rotation of motor 335 and closing of switch 342, relay 346 will be energized to complete a circuit to coil 359 of volume cost relay 124. Thus the volume resistance banks RB-1, RB-2 and RB-3 will be placed in the cost bridge circuit and the cost drum 97 will rotate to place a resistance of 1,000 ohms in circuit to balance the bridge at which time an indication of fifteen cents will be given which is related to a resistance of 1,000 ohms and a volume of 24 cubic inches.

Similarly, if it is desired to allow the shipper to transport up to but not including double the weight for a given volume for the same price, that is, up to but not including two pounds for five cents with a relation such as 8 cubic inches to two pounds between volume and weight it is a simple matter for the operator to adjust the ratio switch 104 so that the movable arm 309 thereof engages the fixed contact 312 associated with resistance RaV-2 to place the latter in series with the volume resistance banks RB-1, RB-2 and RB-3.

The addition of resistance RaV-2 which has a value of 301 ohms, in series with the resistance of series connected resistance banks RB-1, RB-2 and RB-3 which have a combined value of 3,903 ohms for a volume of 8 cubic inches, will give a resultant resistance of 4,204 ohms which is greater than the resistance of weight resistance 51 which will be 3,903 ohms for a weight of over one pound, but less than two pounds on the scale 24. As a result, the servo-amplifier 324 will be energized to energize servo-motor 335 in direction to close switch 342. Consequently, the volume resistance banks RB-1, RB-2 and RB-3 will be placed in the cost bridge circuit and as heretofore described the cost drum 97 will rotate to place a resistance of 1,477 ohms in circuit to balance the bridge at which time an indication of five cents will be given, which is related to a resistance of 1,477 ohms and a volume of 8 cubic inches, and such charge will be given even though the weight of the object is, for example 1.9 pounds.

In the event, however, an object being rated should have a relation between volume and weight equal to or greater than 8 cubic inches to two pounds, the discriminator bridge with the addition of resistance RaV-2 in series with the volume resistance banks RB-1, RB-2 and RB-3 will be balanced when the relation is equal to 8 to 2 or unbalanced in favor of weight when the relation is changed, i. e., 8 to 3. In either case the weight resistance 51 will be placed in the cost bridge circuit as previously described and the cost drum 97 will indicate ten cents or fifteen cents as the case may be based on the weight of the object.

With the zoning switch 105 in the position shown in Fig. 13, the current flowing into the cost bridge will depend solely on the value of the volume resistance banks RB-1, RB-2 and RB-3 or the weight resistance 51 whichver is in circuit. If, for example, the weight resistance is in circuit, and a weight of one pound results in a resistance of 3,903 ohms on the weight resistance 51, the cost drum 97 will rotate to give an indication of five cents. If it is desired to double the rate in the event the package is to be shipped to a second zone further away, it is a relatively simple matter to move the contact arm 399 of the zone switch to engage the contact 398 associated with resistance Z-2, so that the latter will be put in series with weight resistance 51. The circuit is from A. C. main 142, lead 254, wiper arm 63, contact ring 56, lead 55, wiper arm 48, resistance 51, leads 255, 256, 258, 262, closed contacts 263, 387 of weight cost relay 264, leads 386, 383, 388, wiper arm 389, drum resistance 392, contact ring 393, wiper arm 395, leads 396, 397, resistance Z-2, switch arm 399, lead 401 to resistance 402.

As resistance Z-2 has a value of 301 ohms, and resistance 51 has a value of 3,903 ohms, the resultant resistance will be 4,204 ohms and the drum 97 will rotate until a run of resistance 392 thereon is placed in circuit that has a value of 1176 ohms, at which time the cost bridge will be in balance and a charge of ten cents will be indicated on the drum 97. Similarly, the charge may be multiplied by 3, 4 or other factors as desired.

In order to re-set drums 101, 102 and 97 to zero position (which is not required for continuous operation of the equipment), it is merely necessary to press zero switch 237. As a result, a circuit will be completed to the coils 241, 242 and 243 of the volume zero relay 148, weight zero relay 244 and the cost zero relay 245. This circuit is from A. C. main 142, lead 235 to fixed contact 236 of switch 237, movable contact arm 238, to one side of the coil 241 of relay 148 and through lead 239 to one side of the coils 242 and 243 of relays 244 and 245, the other sides of said coils being connected by leads 246, 247 and 248 to A. C. main 135. As a result, the movable arms of the relays 148, 244 and 245 will engage the associated fixed contacts. Referring to volume zero relay 148, when contact arm 188 engages fixed contact 189, a circuit will be completed from A. C. main 135 through lead 191, contacts 188, 189, leads 187, 185 to servo-motor 162 to place the latter in condition for energization. The engagement of movable arm 231 with fixed contact 147 will complete a circuit from A. C. main 142, lead 234, zeroing resistance 233 which illustratively has a value of 2,000 ohms, lead 232, closed contacts 231, 147, leads 146, 144 to wiper arm 145 engaging drum resistance 151 of volume drum 101 and from contact ring 152, wiper arm 175, leads 174 and 178 to one side of resistance 179. As resistance 168 is connected to balancing resistance 171 which has a value of 4,903 ohms, it is apparent that with the 2,000 ohm zeroing resistance placed in series with drum resistance 15, the volume bridge will be unbalanced and the servo-motor 162 will rotate until it engages the run on the volume resistance 151 associated with a resistance of 2,903 ohms which is related to the zero position on the drum. At such time the bridge will be in balance and the servo-motor 162 will stop rotating. As the operation of the weight zero relay 244 and cost zero relay 245 are identical to that of volume zero relay 148 and resistance 233, they will not be described.

After the drums 101, 102 and 97 have rotated to zero position the operator need merely move his finger from the zero switch 237 and the equipment is ready for the next package to be rated.

The equipment herein described will give indications of volume and weight on drums 101 and 102, cost on drum 97 and density on meter 103 and will enable the cost to be based on a predetermined ratio between volume and weight as well as permitting such cost to be multiplied by a given amount depending on the zone to which the object is to be shipped.

However, it is to be understood that various combinations of such equipment could be used to indicate, for example, cost alone with or without the ratio and zone factors, the density alone or with the volume or weight indication.

Inasmuch as the bridges hereinabove describe balance resistances, variations in voltage will not affect the system and hence the resultant reading will be accurate regardless of wide fluctuation in voltage.

Although the Wheatstone bridges utilized in the equipment have been described as being balanced when the balancing resistance is equal to the resistance of the volume and weight arms plus the associated drum resistance, it is of course to be understood that the bridges could be made to balance when the resistances in the two arms of the bridge bearing a definite ratio to each other and the claims are intended to cover this concept. The claims are also intended to cover equipment in which drums are not used, but in which the motors drive selector arms to tap off resistance of different values having a linear scale associated therewith. As the construction of such equipment would be readily apparent to one skilled in the art in view of the disclosures herein, it will not be further described.

The equipment herein shown and described could readily be adapted to measure the combined length and girth of a package, which is important for post office use where limitations are made on the size of a package that may be shipped. To this end the illustrative bridge circuit shown in Fig. 10 is provided in which parts corresponding to those in Fig. 13 will be given the same reference numerals primed. As shown, three resistance banks RB-1', RB-2' and RB-3' are provided, which are substantially identical to the resistance banks RB-1, RB-2 and RB-3 heretofore described. The resistance banks RB-1', RB-2' and RB-3' may be mounted on a measuring frame 65 similar to the one shown in Fig. 1 so as to extend parallel respectively to each of the slots 80, 76 and 78 to be engaged by a contact roller mounted on an associated measuring member 73', 74', 75' to measure length, width and height respectively. The resistance banks are connected in series as shown in the manner similar to resistance banks RB-1, RB-2 and RB-3 so that, depending upon the position of the associated measuring member when in engagement with the end, side and top of the package, resistance of predetermined value may be tapped off each of the resistance banks RB-1', RB-2' and RB-3'.

As the equipment shown in Fig. 10 is to measure the combined length and girth of the package, which is equal to the length plus twice the width and twice the height, successive runs of resistance bank RB-1' are designed to place in circuit resistance correlated with the length of the package and such resistance bank is calibrated so that one inch is related to one ohm. The resistance bank RB-2' and RB-3' are designed to place in circuit resistance of value correlated with twice the width and twice the height of the package to measure the girth and such resistance banks RB-2' and RB-3' are calibrated so that successive runs will place in circuit resistance in increments of two ohms for each inch. Thus, the combined value of the three series connected resistance banks will give the combined length and girth of a package.

An indicating drum 101' is desirably provided which is substantially identical to drums 101, 102 and 97 previously described. The contact rail 95' carries wiper arm 90' which engages resistance bank RB-3' and is connected by lead 501 to the wiper arm 502 engaging the resistance 503 on drum 101'. The contact ring 504 of drum 101' to which the end of resistance 503 is connected, is in turn connected by lead 505 to one end of resistance 506, and also by lead 507 to one of the inputs of servo-amplifier 508.

Assuming that the largest object or package to be measured by the equipment has a combined length and girth of 100 inches, the maximum total resistance of resistance banks RB-1', RB-2' and RB-3' will be 100 ohms. The balancing resistance 509 which is made to have a value of 100 ohms, has one end connected by lead 511 to the end of resistance RB-1' as at 512 which is also connected to fixed contact 513 of switch 514, the movable arm 515 of which is connected to one side of an alternating current line. The other end of resistance 509 is connected by leads 516 and 517 to one end of resistance 518 and also by lead 519 to the other input of servo-amplifier 508. The ends 521 and 522 of resistances 506 and 518 are connected together as at 523 and such connected ends are in turn connected to the other side of the alternating current line. The servo-amplifier 508 has its output connected through lead 524 to servo-motor 525, the latter driving drum 101' by means of shaft 526, the servo-amplifier 508 and servo-motor 525 being similar to the types previously described.

With the equipment set up, as above described, if the resistance banks RB-1', RB-2' and RB-3' have a combined value of 100 ohms for an object 20 inches by 20 inches by 20 inches in order for the bridge to balance, the value of drum resistance 503 in series with such resistance banks would have to be zero ohms and such resistance is correlated with an indication of 100 inches. If an object 20 inches in length by 10 inches in width by 10 inches in height is being measured, the combined resistance of resistance banks RB-1', RB-2 and RB-3' would be 20 plus two times 10 plus two times 10 or 60 ohms. In order for the bridge to balance, the value of drum resistance 503 would have to be 40 ohms and such resistance on the drum is correlated with an indication of 60 inches. Similarly, other values between the smallest and largest dimensions to be classified may be set up.

The equipment shown in Fig. 10 in combination with the measuring frame 65 and measuring members 73', 74' and 75' is readily adaptable for post office use in order to determine the maximum overall dimensions of an object. The postman may merely place the object on the measuring frame 65 and move the measuring members until they engage the end, side and top of the object being classified. Upon closing of switch 514, in the event of unbalance in the bridge, which will occur when the the sum of resistance banks RB-1', RB-2' and RB-3' and drum resistance 503 is greater or less than 100 ohms, current will flow to the servo-amplifier 508 to energize the servo-motor 525 which will rotate in either a clockwise or counterclockwise direction to rotate the drum 101' until such resistance is placed in circuit to balance the bridge and the value corresponding to such resistance will thereupon be indicated.

Although the equipment shown in Fig. 10 has been illustratively described with respect to a specialized use in a post office, it is of course to be understood that it could also be used as an adding machine by simply correlating values to runs of resistance on resistance banks RB-1', RB-2' and RB-3'.

The bridge circuit shown in Fig. 11 may be used to subtract numbers. This circuit is substantially identical to that shown in Fig. 10, except that the resistance banks RB-1', RB-2' and RB-3' are replaced by the single resistance bank RS in series with indicating drum 530 substantially identical to drum 101'. This resistance may be calibrated in any desired manner as, for example, in increments of one, from one to a hundred with each increment having a value of one ohm. The wiper arm 531 which is connected to wiper arm 532 of the drum resistance 533 may be used to tap off any desired value of resistance RS desirably indicated on a scale 534 associated with the wiper arm 531. The wiper arm 535 may be used to short circuit any desired amount of resistance RS which also may be indicated on a scale 536 associated therewith. To use the device, the wiper arm 531 is moved so as to tap off resistance correlated with a given number as, for example, 75, indicated on scale 534. If it is desired to subtract 50, for example, from such number, the wiper arm 535 is moved to this point on scale 536 so as to short circuit 50 ohms of resistance RS. The switch 514' is then closed and the drum 530 will then rotate until the bridge is in balance. Inasmuch as the value of resistance RS remaining in circuit is 25 ohms, drum 530 would be rotated until wiper arm 532 taps off a resistance of 75 ohms on resistance 533 at which time the bridge would be in balance as the sum of resistance RS in circuit and resistance 533 would equal the value of the balancing resistance 509', i. e., 100 ohms and 75 ohms is correlated with a value of 25 on drum 530. Similarly, other values could readily be calculated.

The bridge circuit shown in Fig. 12 which is in many respects similar to the circuit shown in Fig. 10, may be used to multiply and divide.

The three series connected resistance banks RMD-1, RMD-2 and RMD-3 may be formed in the same manner as resistance banks RB-1, RB-2 andl RB3 and successive runs of the resistance wire thereon have resistance values proportional to the logarithm of a given number as follows:

*Tabulation IV*

| Value | Logarithm | Resistance Logarithm × 1,000 |
|---|---|---|
| 2 | .301 | 301 |
| 3 | .477 | 477 |
| 4 | .602 | 602 |
| 5 | .699 | 699 |
| 6 | .778 | 778 |

Assuming that the largest product to be measured by the equipment is 6 times 6 times 6 or 216, the balancing resistance 541 is made to have a value of 2,334 ohms. Thus, for the bridge to balance, the value of the drum resistance 542 in circuit must be the difference between 2,334 ohms and the value of the resistance RMD in circuit. As a result, the following tabulation may be calculated.

*Tabulation V*

| Value | Sum of Resistance Banks RMD-1, RMD-2, and RMD-3 | Drum Resistance |
|---|---|---|
| 8 | 903 | 1,431 |
| 24 | 1,380 | 965 |
| 27 | 1,431 | 903 |
| 64 | 1,806 | 291 |
| 125 | 2,097 | 237 |
| 216 | 2,334 | 0 |

Thus, successive runs on the drum 543 are of value of from 1431 ohms to zero ohms and the periphery of the drum is marked in indications of 8, 24, 27, 64, etc. corresponding to the successive runs.

In the operation of the circuit shown in Fig. 12 if it is desired to multiply 4 by 3 by 2, the wiper arms 544, 545 and 546 associated with resistance banks RMD-1, RMD-2 and RMD-3 are moved to indicate such values on the associated scales 547, 548 and 549. As shown in Tabulation IV, this will place 602, 477 and 301 ohms in series for a total of 1380 ohms. The switch 551 is then closed and as the bridge will be out of balance, drum 543 will be rotated by servo-motor 552 until a run associated with a resistance of 2334-1380 or 965 ohms is in circuit and the bridge is balance. The drum 543 is so calibrated that such resistance of 965 ohms is related to a product of 24.

If it is desired to divide any product, it is merely necessary to move wiper arm 553 associated with resistance bank RMD-1 to the corresponding divisor on scale 554. Thus to divide 24 by 3, the wiper arm 553 would be moved to 3 to short circuit 477 ohms of resistance RMD-1. As a result, the combined value of the three resistance banks would be 1380−477 or 903 ohms and drum 513 would rotate upon closing of switch 551 to place 1431 ohms in circuit which is related to a value of 8 as shown in Tabulation V.

It is of course to be understood that but a single resistance bank RMD could be provided so that a resistance related to a given number could be selected and this number could be divided as above described.

It is of course to be understood that any number of resistance banks RMD could be provided in series, depending upon the number of values to be multiplied and each could be of any desired resistance value.

The circuits above described could readily be combined in a single unit to form a calculating machine which could multiply, divide, add and subtract. As such combined arrangement would be obvious to one skilled in the art, in view of the disclosures herein, it will not be described.

As many changes could be made in the above construction and method, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for rating objects according to volume, comprising circuit control means responsive to the respective dimensions of an object being rated, a resistance bank under control of each of the respective control means, said resistance banks being connected in series and each having resistances thereon of ohmic values which are functions of the logarithms of a sequence of numerical values, said control means being designed to tap off resistance from the associated resistance bank which is a function of the logarithm of a particular numerical value related to a particular dimension of such object, an indicating device having a resistance bank associated therewith and connected in series with said first named resistance banks, a balancing resistance of predetermined value, a Wheatstone bridge circuit, said resistance banks forming one arm of said bridge and said balancing resistance forming another arm thereof, means to tap off resistance of such value from said second named resistance bank, that the sum of said tapped off resistance and the first named resistance banks for a given volume is equal to the value of said balancing resistance, means responsive to the currents in said resistance banks and said balancing resistance to actuate said tapping means, said tapped off resistance having a calibration associated therewith to indicate its related numerical value which is equal to the volume of the object.

2. Equipment for rating objects comprising circuit control means responsive to the respective dimensions of an object being rated, a resistance bank under control of each of the respective control means, said resistance banks each having resistances thereon of ohmic values which are functions of the logarithms of a sequence of numerical values related to the respective dimensions of the object, said control means being designed to tap off resistance from the associated resistance bank which is a function of the logarithm of a particular numerical value related to a particular dimension of such object said resistance banks being connected in series to provide a combined value proportional to the logarithm of the volume of the object, a weighing scale, circuit control means responsive to the weight of such objects, a resistance bank under control of the latter control means, the combined value of the resistance of said series connected resistance banks and said weight resistance bank being correlated to have equal values for corresponding values in the sequences of numerical values of volume and weight, said last named control means being designed to tap off resistance from said weight resistance bank, means to pass currents through said series connected resistance banks and said weight resistance banks, discriminator means responsive to the relative currents in said series connected resistance banks and said weight resistance banks selectively to pass a current equal to that of either the series connected resistance banks or the weight resistance bank, a rating indicating device having a resistance bank associated therewith, means to tap off resistance of progressively different value from said rating resistance bank, means connecting said selected resistance bank related to a given volume or weight in series with said indicating device resistance bank, a balancing resistance, means to pass opposing currents through said indicating resistance bank and the volume or weight resistance bank in series therewith and through said balancing resistance, means controlled by said current to actuate said tapping means to select a resistance from said indicating resistance bank such that the sum of said tapped off resistance and the volume or weight resistance bank for a predetermined numerical value is equal to the value of the balancing resistance, said tapped off resistance having a calibration associated therewith to indicate the rating of the object.

3. The combination set forth in claim 2 in which additional resistance is provided of value proportional to the logarithm of a multiplier and switch means selectively connects such resistance in series with either the volume controlled resistance banks or the weight controlled resistance bank.

4. The combination set forth in claim 2 in which additional resistances are provided associated respectively with said series connected volume controlled resistance banks and said weight controlled resistance bank, said additional resistances each being of value proportional to the logarithm of a multiplier and switch means selectively connects any of said resistances in series with the associated volume or weight resistance banks.

5. The combination set forth in claim 2 in which an indicating device is associated with said series connected volume resistance banks and said weight resistance bank and switch means are provided to connect said volume resistance banks and said weight resistance bank to the associated indicating device and means to disconnect said indicating devices and to switch said series connected resistance banks and said weight resistance bank to said discriminator means for selection for one of said resistance banks and to switch said selected resistance banks to the rating indicating device.

References Cited in the file of this patent

UNITED STATES PATENTS

| Number | Name | Date |
|---|---|---|
| 1,560,046 | Dye | Nov. 3, 1925 |
| 1,573,850 | Naiman | Feb. 23, 1926 |
| 2,025,407 | Williams | Dec. 24, 1935 |
| 2,108,575 | Benedict | Feb. 15, 1938 |
| 2,431,696 | Keister | Dec. 2, 1947 |
| 2,486,068 | Shishini et al. | Oct. 25, 1949 |
| 2,538,826 | Avery | Jan. 23, 1951 |
| 2,584,897 | Marco | Feb. 5, 1952 |
| 2,618,209 | Silent | Nov. 18, 1952 |

FOREIGN PATENTS

| Number | Country | Date |
|---|---|---|
| 652,023 | Great Britain | June 21, 1949 |

OTHER REFERENCES

Electronic Instruments, Greenwood, Holdam and MacCrae, M. I. T. Radiation Laboratory Series, volume 21, published by McGraw-Hill, 1948, pages 23–25 inclusive. Copy in Div. 23.